US011455507B2

(12) United States Patent
Finn

(10) Patent No.: US 11,455,507 B2
(45) Date of Patent: Sep. 27, 2022

(54) METAL TRANSACTION CARDS CONTAINING CERAMIC HAVING SELECTED COLORING AND TEXTURE

(71) Applicant: Federal Card Services, LLC, Cincinnati, OH (US)

(72) Inventor: David Finn, Füssen Weissensee (DE)

(73) Assignee: Federal Card Services, LLC, Cincinnati, OH (US)

( * ) Notice: Subject to any disclaimer, the term of this patent is extended or adjusted under 35 U.S.C. 154(b) by 0 days.

(21) Appl. No.: 17/068,839

(22) Filed: Oct. 13, 2020

(65) Prior Publication Data

US 2021/0110231 A1 Apr. 15, 2021

Related U.S. Application Data

(63) Continuation-in-part of application No. 17/019,378, filed on Sep. 14, 2020.

(60) Provisional application No. 62/927,157, filed on Oct. 29, 2019, provisional application No. 62/914,485, filed on Oct. 13, 2019.

(51) Int. Cl.
*G06K 19/077* (2006.01)
*G06K 19/02* (2006.01)
*G06K 19/07* (2006.01)
*G06K 19/16* (2006.01)

(52) U.S. Cl.
CPC ..... *G06K 19/07722* (2013.01); *G06K 19/022* (2013.01); *G06K 19/025* (2013.01); *G06K 19/0723* (2013.01); *G06K 19/16* (2013.01)

(58) Field of Classification Search
CPC .......... G06K 19/07722; G06K 19/022; G06K 19/025; G06K 19/0723; G06K 19/16; G06K 19/02
See application file for complete search history.

(56) References Cited

U.S. PATENT DOCUMENTS 5,550,402 A 8/1996 Nicklaus
5,855,969 A 1/1999 Robertson et al.
(Continued)

FOREIGN PATENT DOCUMENTS

WO WO2019/173455 9/2019

OTHER PUBLICATIONS

Plastic Overview, Spirol International Corporation, Apr. 2020, 2 pages.
(Continued)

*Primary Examiner* — Seung H Lee
(74) *Attorney, Agent, or Firm* — Michael D. Eisenberg

(57) ABSTRACT

RFID-enabled metal transaction cards may include a specially treated thin decorative layer attached to a thick core layer of metal or metal layers (with a discontinuity to function as a coupling frame), or a combination of ceramic and metal separated by a polymeric material, wherein the thin decorative layer is designed to provide selected color(s) and/or selected texture(s) to a surface of the metal core cards. The decorative layer may comprise (a) an anodized metal layer with a discontinuity; or (b) a ceramic layer on a flexible polymeric material. A ceramic-containing transaction card may comprise a monolithic ceramic layer of ultra-thin, flexible zirconia. A PET or PEN layer laminated to the ultra-thin ceramic layer may absorb mechanical stress from flexing or torsion of the ceramic card body.

27 Claims, 19 Drawing Sheets

(56) References Cited

U.S. PATENT DOCUMENTS

| | | |
|---|---|---|
| 6,007,929 A | 12/1999 | Robertson et al. |
| 6,133,342 A | 10/2000 | Mizobuchi et al. |
| 6,210,472 B1 | 4/2001 | Kwan et al. |
| 6,261,348 B1 | 7/2001 | Kwan et al. |
| 6,491,229 B1 | 12/2002 | Berney |
| 6,617,515 B1 | 9/2003 | Yeung |
| 6,644,552 B1 | 11/2003 | Herslow |
| 6,749,123 B2 | 6/2004 | Lasch et al. |
| 6,843,422 B2 | 1/2005 | Jones et al. |
| 7,048,823 B2 | 5/2006 | Bermel |
| 7,187,396 B2 | 3/2007 | Carroll, Jr. et al. |
| 7,207,494 B2 | 4/2007 | Theodossiou et al. |
| 7,278,580 B2 | 10/2007 | Jones et al. |
| 7,287,704 B2 | 10/2007 | Herslow |
| 7,306,163 B2 | 12/2007 | Scholz et al. |
| 7,544,266 B2 | 6/2009 | Herring et al. |
| 8,393,547 B2 | 3/2013 | Kiekhaefer et al. |
| 8,672,232 B2 | 3/2014 | Herslow |
| 9,024,763 B2 | 5/2015 | Hamedani |
| 9,033,250 B2 | 5/2015 | Finn et al. |
| 9,112,272 B2 | 8/2015 | Finn et al. |
| 9,269,032 B2 | 2/2016 | Zlotnik et al. |
| 9,299,020 B2 | 3/2016 | Zimmerman et al. |
| 9,390,363 B1 | 7/2016 | Herslow et al. |
| 9,390,364 B2 | 7/2016 | Finn et al. |
| 9,390,366 B1 | 7/2016 | Herslow et al. |
| 9,440,481 B1 | 9/2016 | Thomson et al. |
| 9,475,086 B2 | 10/2016 | Finn et al. |
| 9,489,613 B2 | 11/2016 | Finn et al. |
| 9,542,635 B2 | 1/2017 | Herslow |
| 9,569,718 B2 | 2/2017 | Herslow |
| 9,622,359 B2 | 4/2017 | Finn et al. |
| 9,634,391 B2 | 4/2017 | Finn et al. |
| 9,646,234 B1 | 5/2017 | Thomson et al. |
| 9,697,459 B2 | 7/2017 | Finn et al. |
| 9,721,200 B2 | 8/2017 | Herslow et al. |
| 9,760,816 B1 | 9/2017 | Troy et al. |
| 9,798,968 B2 | 10/2017 | Finn et al. |
| 9,812,782 B2 | 11/2017 | Finn et al. |
| D804,569 S | 12/2017 | Williams et al. |
| 9,836,684 B2 | 12/2017 | Finn et al. |
| 9,836,687 B1 | 12/2017 | Troy et al. |
| 9,898,699 B2 | 2/2018 | Herslow et al. |
| D812,685 S | 3/2018 | Williams et al. |
| D813,301 S | 3/2018 | Williams et al. |
| 9,960,476 B2 | 5/2018 | Finn et al. |
| D827,026 S | 8/2018 | Williams et al. |
| 10,089,570 B2 | 10/2018 | Herslow et al. |
| 10,193,211 B2 | 1/2019 | Finn et al. |
| 10,248,902 B1 | 4/2019 | Finn et al. |
| 10,248,903 B2 | 4/2019 | Troy et al. |
| 10,275,703 B2 | 4/2019 | Herslow et al. |
| 10,289,944 B2 | 5/2019 | Herslow et al. |
| 10,311,346 B2 | 6/2019 | Herslow |
| 10,318,859 B2 | 6/2019 | Lowe et al. |
| 10,332,846 B2 | 6/2019 | Herslow |
| 10,373,920 B2 | 8/2019 | Herslow |
| 10,380,476 B1 * | 8/2019 | Vittimberga ............ G06K 19/02 |
| 10,395,153 B2 | 8/2019 | Herslow |
| 10,406,734 B2 | 9/2019 | Lowe |
| 10,427,446 B2 | 10/2019 | Staub et al. |
| 10,445,636 B2 | 10/2019 | Virostek et al. |
| 10,452,967 B2 | 10/2019 | Herslow et al. |
| 10,479,130 B2 | 11/2019 | Herslow et al. |
| 10,518,518 B2 | 12/2019 | Finn et al. |
| 10,534,990 B2 | 1/2020 | Lowe et al. |
| 10,583,683 B1 | 3/2020 | Ridenour et al. |
| 10,599,972 B2 | 3/2020 | Finn et al. |
| 10,679,113 B2 | 6/2020 | Herslow et al. |
| 10,762,412 B2 | 9/2020 | Lowe et al. |
| 10,552,722 B2 | 10/2020 | Finn et al. |
| 2005/0003297 A1 | 1/2005 | Labrec |
| 2005/0040243 A1 | 2/2005 | Daoshen et al. |
| 2005/0095408 A1 | 5/2005 | Labrec et al. |
| 2008/0124498 A1 | 5/2008 | Cole et al. |
| 2008/0296887 A1 | 12/2008 | Baggenstos |
| 2010/0116891 A1 | 5/2010 | Yano et al. |
| 2012/0325914 A1 | 12/2012 | Herslow |
| 2013/0126622 A1 | 5/2013 | Finn |
| 2015/0021403 A1 | 1/2015 | Finn et al. |
| 2015/0269477 A1 | 9/2015 | Finn et al. |
| 2016/0229081 A1 | 8/2016 | Troy et al. |
| 2016/0232438 A1 | 8/2016 | Troy et al. |
| 2017/0098151 A1 | 4/2017 | Herslow et al. |
| 2017/0316300 A1 | 11/2017 | Herslow et al. |
| 2017/0344869 A1 | 11/2017 | Troy et al. |
| 2017/0344870 A1 | 11/2017 | Troy et al. |
| 2018/0068212 A1 | 3/2018 | Williams et al. |
| 2018/0341846 A1 | 3/2018 | Finn et al. |
| 2018/0123221 A1 * | 5/2018 | Finn ..................... H01Q 7/005 |
| 2018/0129927 A1 | 5/2018 | Herslow et al. |
| 2018/0197062 A1 | 7/2018 | Herslow et al. |
| 2018/0207903 A1 * | 7/2018 | Lowe ..................... B32B 9/045 |
| 2018/0330214 A1 | 11/2018 | Gao et al. |
| 2018/0339503 A1 | 11/2018 | Finn et al. |
| 2018/0341847 A1 | 11/2018 | Finn et al. |
| 2018/0349751 A1 | 12/2018 | Herslow et al. |
| 2019/0392283 A1 | 1/2019 | Finn et al. |
| 2019/0050706 A1 | 2/2019 | Lowe |
| 2019/0114526 A1 | 4/2019 | Finn et al. |
| 2019/0171923 A1 | 6/2019 | Finn |
| 2019/0197386 A1 | 6/2019 | Finn et al. |
| 2019/0236434 A1 | 8/2019 | Lowe |
| 2019/0286961 A1 | 9/2019 | Lowe |
| 2019/0311235 A1 | 10/2019 | Sexl et al. |
| 2019/0311236 A1 | 10/2019 | Sexl et al. |
| 2019/0332907 A1 | 10/2019 | Herslow |
| 2019/0354825 A1 | 11/2019 | Lowe |
| 2019/0378805 A1 | 12/2019 | Herslow |
| 2020/0005114 A1 | 1/2020 | Finn et al. |
| 2020/0034578 A1 | 1/2020 | Finn et al. |
| 2020/0039280 A1 | 2/2020 | Herslow et al. |
| 2020/0050914 A1 | 2/2020 | Finn et al. |
| 2020/0151534 A1 | 5/2020 | Finn et al. |

OTHER PUBLICATIONS

T900306, Cast Modified Epoxy Adhesive, GTS Flexible Materials, Feb. 13, 2019, 2pp.

DEVT-008-20, Epoxy Adhesive Pen Tapes, GTS Flexible Materials, Jan. 9, 2020, 2pp.

* cited by examiner self-supporting layer of ultra-thin flexible ceramic self-supporting layer of ultra-thin flexible ceramic

METAL TRANSACTION CARDS CONTAINING CERAMIC HAVING SELECTED COLORING AND TEXTURE

CROSS-REFERENCE(S) TO RELATED APPLICATION(S)

Priority (filing date benefit) is claimed from the following, incorporated by reference herein:
 a continuation-in-part of Ser. No. 17/019,378 filed 14 Sep. 2020
 a nonprovisional of 62/927,157 filed 29 Oct. 2019
 a nonprovisional of 62/914,485 filed 13 Oct. 2019

FIELD OF THE INVENTION

This invention relates to the field of RFID-enabled metal transaction cards (smartcards) and, more particularly, metal transaction cards (smartcards) having at least one layer or coating of ceramic and/or a ceramic insert, and in addition metal transaction cards having an anodized aluminum coating supported by a base metal layer.

Some of the disclosure(s) herein may relate to transaction cards having only a contactless interface, only a contact interface or both (dual interface).

BACKGROUND OF THE INVENTION

Ceramic-containing metal transaction cards provide a premium feel and look, and may also have tactile features, with such prestigious cards destined for the affluent market. Metal transaction cards comprising ceramic, having ceramic inserts, or utilizing a ceramic coating may be obtained in a variety of colors and with a variety of desired features such as, e.g., laser signatures or decorative designs.

Ceramic-containing metal transaction cards are designed to make a statement as compared to standard metal smartcards. However, ceramic-containing metal cards have a serious drawback that the ceramic may become brittle and crack under mechanical flexing.

The prior art cites zirconia as the ceramic of choice, made from the element of zirconium and oxygen. Yttrium is added to stabilize the structure. Ceramic card size tiles (85.60 mm×53.98 mm) with a thickness of 200, 250 or 300 μm may be laminated to a metal core providing mechanical stability, but slight bending of the card body results in micro-cracks to the ceramic tile.

RFID-enabled metal transaction cards having at least one layer of ceramic or an insert of ceramic are further faced with the complication of integrating contactless communication while at the same time maintaining the mechanical integrity of the card body.

It has become desirable to provide metal or ceramic-metal hybrid cards for the affluent market, imparting a sense of wealth and distinction to the card holder. It is also desirable to provide metal cards with different colors and textures to further enhance the visual appearance and tactile feeling (haptics), and/or provide a degree of card personalization through lasing or CNC engraving of the front or rear surfaces including the perimeter edges.

It is known to use physical vapor deposition (PVD) to color metal transaction cards, but the PVD treatment is limited in its color range. It also subjects the metal to high temperatures which can warp or bow the metal.

In metal core transaction cards (aka as embedded metal and metal veneer), printed PVC, PETG or PC layers, or other synthetic materials are used to decorate the outside layers of the edge-to-edge metal transaction cards. The use of these polymeric layers has undesirable traits such as a minimum polymeric thickness for lithographic or digital printing, loss in the overall weight of the card due to the presence of the <lamination press.

SOME PATENTS AND PUBLICATIONS OF INTEREST

The following patents and/or publications ("references") may be of interest or relevant to the invention(s) disclosed herein, and some commentary may be provided to distinguish the invention(s) disclosed herein from the following references.

U.S. Pat. No. 9,697,459 (2017 Sep. 4; Féinics AmaTech Teoranta; Finn et al.), incorporated by reference herein, discloses passive smart cards, metal cards, payment objects and smart jewelry. RFID devices comprising (i) a transponder chip module (TCM, 1410) having an RFIC chip (IC) and a module antenna (MA), and (ii) a coupling frame (CF) having an electrical discontinuity comprising a slit (S) or non-conductive stripe (NCS). The coupling frame may be disposed closely adjacent the transponder chip module so that the slit overlaps the module antenna. The RFID device may be a payment object such as a jewelry item having a metal component modified with a slit (S) to function as a coupling frame. The coupling frame may be moved (such as rotated) to position the slit to selectively overlap the module antennas (MA) of one or more transponder chip modules (TCM-1, TCM-2) disposed in the payment object, thereby selectively enhancing (including enabling) contactless communication between a given transponder chip module in the payment object and another RFID device such as an external contactless reader. The coupling frame may be tubular. A card body construction for a metal smart card is disclosed.

FIG. 3D of U.S. Pat. No. 9,697,459 illustrates a design of a hybrid ceramic and metal smart card (SC) 300. The card body (CB) 302 may be made of solid metal and feature a slit (S) 330 at the position of the transponder chip module (TCM) 310. The card body with slit may function as a coupling frame (CF) 320, with the slit overlapping the module antenna of the transponder chip module. The metal card body may feature a recess that may cover most of the size of the card and extend around the slit position to the periphery of the card. This recess may be filled by gluing or laminating a molded or cut ceramic insert 304. This allows the card to retain the mechanical strength of the metal (e.g. stainless steel, titanium, tungsten) and have the aesthetic appearance and appeal of a polished ceramic finish.

FIG. 3D of U.S. Pat. No. 9,697,459 is a perspective view (exploded) of a hybrid ceramic and metal smart card.

U.S. Pat. No. 9,760,816 (12 Sep. 2017; American Express; Troy et al.) discloses metal-containing transaction cards and methods of making the same. A transaction card is provided comprising a card body comprising a metallic material, the card body including a primary surface, a secondary surface, an aperture and a slit, wherein the primary surface and the secondary surface are coated with a diamond like carbon (DLC) coating.

U.S. Pat. No. 9,836,687 (5 Dec. 2017; American Express; Troy et al.) discloses ceramic-containing transaction cards and methods of making the same. A transaction card includes a card body that may comprise a card body comprising a ceramic material, the card body including a primary surface and a first mating surface. A card backer comprises a metallic material and includes a secondary surface and a second mating surface. A portion of the first mating surface and a portion of the second mating surface are coupled together.

U.S. Pat. No. 10,248,903 (2 Apr. 2019; American Express; Troy et al.) and U.S. Pat. No. 10,331,994 (25 Jun. 2019; American Express; Troy et al.) both disclose method for creating ceramic-containing transaction cards. A transaction card includes a card body that may comprise a card body comprising a ceramic material, the card body including a primary surface and a first mating surface. A card backer comprises a metallic material and includes a secondary surface and a second mating surface. A portion of the first mating surface and a portion of the second mating surface are coupled together.

Reference is also made to the following:
US 2016/0229081 (11 Aug. 2016; Troy et al.; American Express)
US 2016/0232438 (11 Aug. 2016) Troy et al.; American Express)
US 2017/0344869 (30 Nov. 2017) Troy et al.; American Express)
US 2017/0344870 (30 Nov. 2017) Troy et al.; American Express)
US 2018/0068212 (8 Mar. 2018; Williams et al.)
D827,026 (28 Aug. 2018; Williams et al.)
D813,301 (20 Mar. 2018; Williams et al.)
D812,685 (13 Mar. 2018; Williams et al.)
D804,569 (5 Dec. 2017; Williams et al.)
U.S. Pat. No. 9,269,032 (23 Feb. 2016; Zlotech; Zlotnik et al.) discloses glass-containing transaction card and method of making the same. In one embodiment, the glass-containing transaction card may be comprised of a plurality of substantially planar sheets having front and back surfaces bounded by a continuous peripheral edge, wherein at least one of the pluralities of substantially planer layers is comprise of a glass. In one embodiment, the glass layer of the transaction card may be a chemically strengthened glass selected from the group consisting of aluminosilicate, borosilicate, aluminoborosilicate and soda lime glasses. Preferably, the glass is aluminosilicate glass chemically strengthened by alkali metal ion-exchange. The glass-containing transaction card may further have other layers such as additional glass layers, polymeric materials, ceramic materials, metallic materials, or other glass materials and the like. The glass-containing transaction card may further have other layers comprising infrared-blocking materials detectable by an ATM and card assembly line.

US 2017/0316300 (2 Nov. 2017; CompoSecure; Herslow et al.), incorporated by reference herein, discloses ceramic-containing and ceramic composite transaction cards. A transaction card includes a monolithic ceramic card body having one or more pockets, and at least one of a magnetic stripe, a barcode, and a laser signature portion. The one or more pockets may be configured to receive at least one of the magnetic stripe, the barcode, a contact chip module, a contactless chip module, a dual interface chip module, a booster antenna, a hologram or commercial indicia. A transaction card may also include a substrate layer having a first side and a second side. A first ceramic layer is connected to the first side of the substrate layer.

SOME ADDITIONAL REFERENCES

The following US patents and patent application publications are referenced:
U.S. Pat. No. 10,599,972 (2020 Mar. 24; Finn et al.)
U.S. Pat. No. 10,552,722 Smartcard with coupling frame antenna
U.S. Pat. No. 10,518,518 (2019 Dec. 31; Finn et al.)
U.S. Pat. No. 10,248,902 Coupling frames for RFID devices
U.S. Pat. No. 10,193,211 Smartcards, RFID devices, wearables and methods
U.S. Pat. No. 9,960,476 Smartcard constructions
U.S. Pat. No. 9,836,684 Smartcards, payment objects and methods
U.S. Pat. No. 9,697,459 Passive smartcards, metal cards, payment objects
U.S. Pat. No. 9,812,782 Coupling frames for RFID devices
U.S. Pat. No. 9,390,364 Transponder chip module with coupling frame on a common substrate
U.S. Pat. No. 9,489,613 RFID transponder chip modules with a band of the antenna extending inward
U.S. Pat. No. 9,634,391 RFID transponder chip modules
U.S. Pat. No. 9,622,359 RFID transponder chip modules
U.S. Pat. No. 9,798,968 Smartcard with coupling frame and method of increasing activation distance
U.S. Pat. No. 9,475,086 Smartcard with coupling frame and method of increasing activation distance
2018/0339503 Smartcards with metal layers and methods of manufacture
2018/0341846 Contactless metal card construction
2018/0341847 Smartcard with coupling frame antenna
2019/0114526 Smartcard constructions and methods
2019/0171923 Metallized smartcard constructions and methods
2019/0197386 Contactless smartcards with multiple coupling frames FIG. 3 of U.S. Pat. No. 9,836,684 illustrates the front side of a smartcard (SC) 300 which may be a metal card having a metal layer (ML), which may constitute substantially the entire thickness of the card body (CB) 302. The card body (CB) may have a module opening (MO) 308 wherein a transponder chip module (TCM) 310 may be disposed, and a slit (S) 330 extending from the module opening (MO) to the outer perimeter of the metal layer (ML) so that the metal card body (MCB) 302 may function as a coupling frame (CF) 320. The metal layer (ML) (or card body CB, or metal card body MCB) may comprise stainless steel or titanium, and is provided with a slit, slot or gap in the metal to create an open loop coupling frame closely adjacent to and substantially fully surrounding the transponder chip module (TCM). The slit (S) may overlap a portion of the module antenna (MA) 312 of the transponder chip module (TCM).

The smartcard 300 with a front side consisting of a metal layer may be referred to as a metal face smartcard. The slit may be a micro-slit having a width of less than 50 μm. The smartcard 300 may comprise of a metal layer sandwiched between two plastic layers and may be referred to as a metal core smartcard or an "embedded metal smartcard.

Analysis of Some Prior Art with Respect to Multi-Layered Metal Stack-Up Card Constructions U.S. Pat. No. 9,798,968 (2017 Oct. 24; Finn et al.; Féinics AmaTech Teoranta) discloses smartcard with coupling frame and method of increasing activation distance of a transponder chip module. A conductive coupling frame (CF) having two ends, forming an open loop having two ends or a discontinuous metal layer disposed surrounding and closely adjacent a transponder chip module (TCM, 610), and substantially coplanar with an antenna structure (AS, CES, LES) in the transponder chip module (TCM). A metal card body (MCB, CB) or a transaction card with a discontinuous metal layer having a slit (S) or a non-conductive strip (NCS, 1034) extending from a module opening (MO) to a periphery of the card body to function as a coupling frame (CF). The coupling frame (CF) may be thick enough to be non-transparent to RF at frequencies of interest. A switch (SW) may be provided to connect ends of the coupling frame (CF) across the slit (S, 630). A reinforcing structure (RS) may be provided to stabilize the coupling frame (CF) and card body (CB). The transponder chip module (TCM) may comprise an antenna structure which may be a laser-etched antenna structure (LES) or a chemical-etched antenna structure (CES) and may comprise and a non-perforated contact pad (CP) arrangement. A coupling frame (CF) may be incorporated onto the module tape (MT, CCT) for a transponder chip module (TCM).

The coupling frames disclosed in U.S. Pat. No. 9,798,968 may be formed from layers of various metals (such as copper, aluminum (aluminum), brass, titanium, tungsten, stainless steel, silver, graphene, silver nanowires, conductive carbon ink), and may be in the form of ribbon cable, or the like, which could be hot stamped into a layer of the card.

The metal card or metal slug in a card body acting as the coupling frame can be made from materials such as copper, aluminum, tungsten, stainless steel, brass, titanium or a combination thereof.

The metal layer may comprise a material selected from the group consisting of copper, aluminum (aluminum), brass, titanium, tungsten, stainless steel, silver, graphene, silver nanowires and conductive carbon ink. The metal layer may be disposed on a non-conductive layer by a process selected from the group consisting of silk screen printing and vapor deposition. The metal layer may comprise a mesh. The metal layer may comprise an engraving, embossing, or stamped feature/logo/ID which serves as a security feature for the smartcard.

Coupling frames (CFs) can be made from foil metals, thickness from 9-100 µm or from bulk metal with thickness up to the total normal thickness of a smartcard (760 µm). The metal can be any metal or alloy, for example copper, aluminum, brass, steel, tungsten, titanium. The metal foil may be of any origin, e.g. electrodeposited or roll annealed. The coupling frames (CF) may be made by electroless deposition on a substrate followed by electroplating.

As an alternative to forming (such as by cutting or etching) a slit (S) is to render a comparable area of the conductive layer of the coupling frame (CF) non-conductive. One example of converting a conductive material (such as aluminum or titanium) to non-conductive is described in US 2010/0078329. In its simplest form, electrochemical anodic oxidation of selected portions of an initially conductive valve metal (for example, aluminum, titanium, or tantalum) substrate may be performed, resulting in areas (regions) of conductive (starting) material which are geometrically defined and isolated from one another by areas (regions) of anodized (non-conductive, such as aluminum oxide, or alumina) isolation structures.

Claim 8 of U.S. Pat. No. 9,798,968: A smartcard comprising:
a transponder chip module comprising an RFID chip and an antenna; and
a coupling frame, comprising:
a metal layer;
an opening in the metal layer for receiving the transponder chip module; and
a discontinuity, comprising a slit or a non-conductive stripe, extending from the opening to a periphery of the metal layer; wherein the coupling frame is disposed coplanar with the transponder chip module.

Claim 13 of U.S. Pat. No. 9,798,968: The smartcard of claim 8, wherein the metal layer is characterized by at least one of:
the metal layer comprises a material selected from the group consisting of copper, aluminum, brass, titanium, tungsten, stainless steel, silver, graphene, silver nanowires and conductive carbon ink;
the metal layer is disposed on a non-conductive layer by a process selected from the group consisting of silk screen printing and vapor deposition; the metal layer comprises a mesh; and
the metal layer comprises an engraving, embossing, or stamped feature/logo/ID which serves as a security feature for the smartcard.

FIG. 4A U.S. Pat. No. 9,798,968 is an exploded view of a smartcard (SC) having two coupling frames (CF) on two different layers.

FIG. 4A of U.S. Pat. No. 9,798,968 illustrates an embodiment of a smartcard 400A having a multiple coupling frame stack-up. Here, there are two coupling frames (CF-1, CF-2) 421, 422 in different layers of the card body (CB), separated by a layer 423 of non-conductive material (such as PVC). The stack-up comprises a front face card layer 424, a first coupling frame (CF-1) 421, an internal card dielectric layer 423, a second coupling frame (CF-2) 422 and a rear face card layer 426. The first coupling frame (CF-1) surrounds the top, left and bottom edges of the transponder chip module (TCM) 410, and extends to the top, left and bottom edges of the card body (CB), and has a module opening (MO-1). The second coupling frame (CF-2) surrounds the top, right and bottom edges transponder chip module (TCM), and extends to the top, right and bottom edges of the card, and has a module opening (MO-2). In aggregate, the first and second coupling frames (which may be referred to as "420") cover nearly the entire surface of the card body 402 (less the area of the transponder chip module TCM). An activation distance of 40 mm was achieved.

U.S. Pat. No. 9,697,459 (2017 Sep. 4; Finn et al.; Féinics AmaTech Teoranta) discloses passive smart cards, metal cards, payment objects and smart jewelry. RFID devices comprising (i) a transponder chip module (TCM, 1410) having an RFIC chip (IC) and a module antenna (MA), and (ii) a coupling frame (CF) having an electrical discontinuity comprising a slit (S) or non-conductive stripe (NCS). The coupling frame may be disposed closely adjacent the transponder chip module so that the slit overlaps the module antenna. The RFID device may be a payment object such as a jewelry item having a metal component modified with a slit (S) to function as a coupling frame. The coupling frame may be moved (such as rotated) to position the slit to selectively overlap the module antennas (MA) of one or more transponder chip modules (TCM-1, TCM-2) disposed in the payment object, thereby selectively enhancing (including enabling) contactless communication between a given transponder chip module in the payment object and another RFID device such as an external contactless reader. The coupling frame may be tubular. A card body construction for a metal smart card is disclosed.

A card body can be made from aluminum and directly colored by anodizing procedures.

FIG. 9A of U.S. Pat. No. 9,697,459 is a perspective view (exploded) of a construction of a card body of a smart card.

FIG. 9A of U.S. Pat. No. 9,697,459 shows a card body construction for a smart card (SC). Typically, a metal card body would have an opening on the rear (back side) of the card body to allow contactless communication with a transponder chip module inside of the metal card. (The back-side opening may also accommodate the size of the mold mass on the transponder chip module.) A dual-interface module would have contact pads on the front side, also blocking contactless communication with the chip module.

In this construction, there is a conventional recess (opening) extending into the front side of the card to accommodate a dual-interface transponder chip module (TCM), with its the contact pads exposed. The card body construction may be layered, as follows: a first (top) metal layer, having a thickness of approximately 300 μm, and having an opening for receiving the transponder chip module and a slit 930A extending from the opening to an outer edge of the layer, so that the layer may function as a coupling frame 920A. The slit may extend entirely across no-man's land, and its width may be approximately equal to the width (or transverse height) of no-man's land; a layer of adhesive, having a thickness of approximately 20 μm; a second (middle) metal layer having a thickness of approximately 100 μm. The second metal layer may have an opening for the mold mass of the transponder chip module and a slit 930B extending from the opening to an outer edge of the layer, so that the layer may function as a coupling frame 930B. The module antenna of the chip module may reside on this layer, so that the slit overlaps the module antenna outside of the opening. a layer of adhesive, having a thickness of approximately 20 μm; a third (bottom) metal having a thickness of approximately 320 μm. The third metal layer may have a slit 930C extending from an interior position of the layer to the outer edge of the layer so that the layer may function as a coupling frame 920C. This layer does not need an opening for the chip module or mold mass. The slit overlaps (underlies) the module antenna.

Alternatively, this card body construction could be produced having only two layers of metal or even one layer of metal. The layers can be separated electrically by an adhesive, or the layers can be welded together to form a homogenous conductive layer.

In an electromagnetic field generated by a point of sale terminal, the surface current around the slit may provide the power delivery to the chip by coupling the energy to the overlapping module antenna of the transponder chip module. The coupling may be a combination of capacitive and inductive coupling, i.e. reactive coupling.

U.S. Pat. No. 10,679,113 (2020 Jun. 9; Herslow) discloses transaction and ID cards having selected texture and coloring. Cards made in accordance with the invention include a specially treated thin decorative layer attached to a thick core layer of metal or ceramic material, where the thin decorative layer is designed to provide selected color(s) and/or selected texture(s) to a surface of the metal cards. Decorative layers for use in practicing the invention include: (a) an anodized metal layer; or (b) a layer of material derived from plant or animal matter (e.g., wood, leather); or (c) an assortment of aggregate binder material (e.g., cement, mortar, epoxies) mixed with laser reactive materials (e.g., finely divided carbon); or (d) a ceramic layer; and (e) a layer of crystal fabric material. The cards may be dual interface smart cards which can be read in a contactless manner and/or via contacts.

US 2017/0098151 (2017 Apr. 6; Herslow et al., CompoSecure), incorporated by reference herein, discloses transaction and ID cards having selected texture and coloring. Cards which include a specially treated thin decorative layer attached to a thick core layer of metal or ceramic material, where the thin decorative layer is designed to provide selected color(s) and/or selected texture(s) to a surface of the metal cards. Decorative layers for use in practicing the invention include: (a) an anodized metal layer; or (b) a layer of material derived from plant or animal matter (e.g., wood, leather); or (c) an assortment of aggregate binder material (e.g., cement, mortar, epoxies) mixed with laser reactive materials (e.g., finely divided carbon); or (d) a ceramic layer; and (e) a layer of crystal fabric material. The cards may be dual interface smart cards which can be read in a contactless manner and/or via contacts.

US 2018/0129927 (10 May 2018; CompoSecure; Herslow et al.) discloses transaction and ID cards having selected texture and coloring. Cards which include a decorative layer attached to a core layer, where the decorative layer is designed to provide selected color(s) and/or selected texture(s) to a surface of the metal cards. At least one of the decorative layers is a layer derived from animal matter (e.g. leather). The cards may be dual interface smart cards configured to be read in a contactless manner and/or via contacts.

US 2018/0197062 (11 Jul. 2018; CompoSecure; Herslow et al.) discloses transaction and ID cards having selected texture and coloring. Cards which include a decorative layer attached to a core layer, where the decorative layer is designed to provide selected color(s) and/or selected texture(s) to a surface of the metal cards. At least one of the decorative layers is a layer derived from plant matter (e.g., wood). The cards may be dual interface smart cards that can be read in a contactless manner and/or via contacts.

Some Definitions

Some of the following terms may be used or referred to, herein.

Ceramic Card

A solid ceramic material may comprise any suitable ceramic as well as any suitable binder, dopant, or other adjunct (e.g. a dye) that may impart one or more physical characteristics to the ceramic. A ceramic material may comprise zirconium dioxide (zirconia), silicon carbide, boron carbide, or the like. Suitable dopants include yttria ($Y_2O_3$), calcium oxide, aluminum oxide, silicon dioxide, and other rare earth metals and their oxides. Suitable binders may include sodium silicate, magnesium aluminum silicates, polyvinyl alcohol, starches, carboxymethylcellulose, dextrin, and various the like. Various dyes may be used to alter the color of any portion or all of the card body.

The ceramic is delivered as polished thin-film substrates (tiles) with excellent surface smoothness.

Ceramic Coating

Ceramic nanoparticles, typically sprayed-on, adhere to a metal card body forming a protection film that reduces friction and wear, with anti-scratch properties and abrasion resistance. The film also has a hydrophobic and oleophobic pearl effect. http://ceracoat.me/about.php Typical characteristics of a ceramic coating material:
Active basis: fluorine-ceramic bonding
Appearance: Colorless liquid
pH: 9.5-10
Solids content: 0.5 wt %.
Viscosity: (DIN 53211): 48 s Water and Oil Repellents for Ceramics On ceramic surfaces the repellent provides anti-reflective, hydrophobic and oleophobic properties. https://www.cytonix.com/hydrophobic-oleophobic-s/1843.htm RFID Slit Technology "RFID Slit Technology" refers to modifying a metal layer or a metal card body (MCB) into a so-called "antenna circuit" by providing a discontinuity in the form of a slit, slot or gap in the metal layer or metal card body (MCB) which extends from a peripheral edge to an inner area or opening in the layer or card body. The concentration of surface current at the inner area or opening can be picked up by another antenna (such as a module antenna) or an antenna circuit by means of inductive coupling which can drive an electronic circuit such as an RFID chip attached directly or indirectly thereto. The slit may be ultra-fine (typically less than 50 μm or less than 100 μm), cut entirely through the metal with a UV laser, with the debris from the plume removed by ultrasonic or plasma cleaning. Without a cleaning step after lasing, the contamination may lead to shorting across the slit. In addition, the slit may be filled with a dielectric to avoid such shorting during flexing of the metal forming the transaction card. The laser-cut slit may be further reinforced with the same filler such as a resin, epoxy, mold material, repair liquid or sealant applied and allowed to cure to a hardened state or flexible state. The filler may be dispensed or injection molded. The term "slit technology" may also refer to a "coupling frame" with the aforementioned slit, or to a smartcard embodying the slit technology or having a coupling frame incorporated therein.

Providing a metal layer in a stackup of a card body, or an entire metal card body, to have a module opening for receiving a transponder chip module (TCM) and a slit (S) to improve contactless (RF) interface with the card—in other words, a "coupling frame"—may be described in greater detail in U.S. Pat. Nos. 9,475,086, 9,798,968, and in some other patents that may be mentioned herein. In some cases, a coupling frame may be formed from a metal layer or metal card body having a slit, without having a module opening. A typical slit may have a width of approximately 100 μm. As may be used herein, a "micro-slit" refers to a slit having a smaller width, such as approximately 50 μm, or less.

Laser Finishing, Engraving and Etching Ceramic

Laser finishing may refer to application of a laser to a ceramic material to remove and/or disrupt a glossy and/or highly reflective finish. In that regard, laser finishing may impart a matte finish on a ceramic material surface.

Laser engraving may refer to application of a laser to a ceramic material to impart a visible disruption to the ceramic material surface. Laser engraving may be used to impart readable text onto a ceramic material surface. Account indicia such as an account number, an account-holder's name, a loyalty notation, an expiration date, a signature, a brand name, or other indicia such as legal notices, regulatory compliance messages, phone numbers, URLs, email addresses, trademarks, pictures, graphics, bar codes, CVV code or any alphanumeric characters may be laser engraved onto a ceramic material surface.

Laser etch may refer to application of a laser to a ceramic material to impart an indentation to the ceramic material surface. Laser etching may be used to impart various graphic features onto a ceramic material surface. A logo, a decorative border, and/or other features may be laser etched onto a ceramic material surface.

Anodizing Process

Anodizing may be accomplished by immersing aluminum into an acid electrolyte bath (tank) and passing an electric current through the medium. A cathode is mounted to the inside of the anodizing tank; the aluminum acts as an anode, so that oxygen ions are released from the electrolyte to combine with the aluminum atoms at the surface of the part being anodized. Anodizing is, therefore, a matter of highly controlled oxidation—the enhancement of a naturally occurring phenomenon. Color may be introduced by running the anodized foil through a dye bath of the appropriate (desired) color and then a sealer bath.

Polymeric Layer

The polymeric (support) layer for assembly to one side of a brittle ceramic layer may be composed of a PET or PEN layer or a material similar to duct tape. The ceramic layer may also be encased in PET or a similar synthetic material.

Duct Tape

Duct tape is cloth- or scrim-backed pressure-sensitive tape. It is made with any one of a variety of woven fabrics to provide strength. The threads or fill yarn of the fabric may be cotton, polyester, nylon, rayon or fiberglass. The fabric is a very thin gauze called "scrim" which is laminated to a backing of low-density polyethylene (LDPE). "Gauze" is a weave structure in which the weft yarns are arranged in pairs.

Analysis of the Prior Art with Respect to the Properties of Ceramic

Some of the prior art cites zirconia as the ceramic of choice, made from the element of zirconium and oxygen. Yttrium is added to stabilize the structure. The stability of the structure depends on heat. It is stable in a tetragonal phase but becomes brittle in a monoclinic phase.

The prior art appears to be silent on the use of "flexible ceramic" to resolve the issue of brittleness and cracking during mechanical flexing of the card body.

Ultra-Thin Flexible 3YSZ Ceramic

Thermal and Electrical Characterizations of Ultra-Thin Flexible 3YSZ Ceramic for Electronic Packaging Applications, Xin Zhao et al. International Symposium on Microelectronics: Fall 2016, Vol. 2016, No. 1, pp. 000391-000396 https://doi.org/10.4071/isom-2016-THA13

This paper presents thermal and electrical characterizations of an ultra-thin flexible 3YSZ (3 mol % Yttria Stabilized Zirconia) ceramic substrate to explore its potential for electronic packaging applications. The thicknesses of the ultra-thin 3YSZ substrates were 20 μm and 40 μm. The flexible thin ceramic substrate can provide not only better modulus for higher robustness in manufacturing, especially in Z-axis direction of modules, but also low thermal resistance for high density 2D (two dimensional)/3D (three dimensional) power module packaging applications. To better understand the thermal and electrical properties of the ultra-thin flexible ceramic, different measurements were employed. Thermal conductivity was measured at different temperatures by 3-omega method, the results were verified by thermo-reflectance measurement at room temperature. Relative permittivity was measured from 100 Hz to 10 MHz, with dielectric losses determined by dielectric spectroscopy. The dielectric breakdown of the ultra-thin flexible 3YSZ was measured, from room temperature to 150° C. Weibull analysis was performed on 20 measurements for each temperature. The test results showed that the thermal conductivity of 3YSZ decreased from 3.3 W/mK at 235 K to 2.2 W/Mk at 600 K. The relative permittivity decreased from 30.9 to 27.3 for higher frequencies for both substrates with different thickness. The temperature-dependence of relative permittivity and dielectric loss was studied. The results showed that these two parameters increased slowly from −65° C. to 150° C., but more rapidly from 175° C. to 250° C. The dielectric breakdown decreased at higher temperature, from 5.76 kV to 2.64 kV for thickness of 20 μm, 7.84 kV to 3.36 kV for thickness of 40 μm. SEM (Scanning Electron Microscopy), EDS (Energy-dispersive X-ray Spectroscopy) and XRD (X-ray Powder Diffraction) analysis was performed to compare the microstructure of 3YSZ ultra-thin substrate and that of MN (Aluminum Nitride) substrate. The microstructure of 3YSZ consisted of smaller round particles and that of MN contained larger columnar particles. FEA (Finite Element Analysis) simulations were also applied to demonstrate the thermal properties of 3YSZ in simplified model of power modules. Though the measurement results showed that it did not meet expectations for high temperature power modules, the present work showed potential applications of the ultra-thin 3YSZ substrates in low voltage power modules, LED modules.

As a ceramic, 3YSZ is inert, of high purity, tolerates processing temperatures to 1200° C., and with its low thermal mass can tolerate high thermal shock during deposition or coating processes. Being ultra-thin to 20 microns thick, it presents a very low thermal resistance path for heat removal and a super thin profile for component coating. Multi-layers can easily be stacked into low profile components.

SUMMARY

The invention may relate to innovations in or improvements to RFID-enabled ceramic-containing metal transaction cards or contact only ceramic-containing metal transaction cards.

Various aspects of the invention may relate to RFID-enabled transaction cards with a layer or a coating of ceramic.

It is an object of the invention to create durable ceramic-containing transaction cards in which the ceramic is not prone to deterioration in the case of a sprayed-on ceramic coating or cracking in the case of a solid ceramic, under mechanical stress.

It is an object of the current invention to create RFID-enabled ceramic transaction cards that do not crack or become brittle under mechanical stress.

It is an object of the current invention to create RFID-enabled transaction cards with special colors and texture which may also incorporate a ceramic or glass tile.

Some of the techniques disclosed herein may be applicable to smartcards which are not RFID-enabled—are not contactless—but which have only a contact interface.

According to the invention, generally, a ceramic-containing transaction card may comprise a monolithic ceramic layer of ultra-thin, flexible zirconia. A PET or PEN layer laminated to the ultra-thin ceramic layer may absorb mechanical stress from flexing or torsion of the ceramic card body. A polymer layer, such as PET or PEN, may be incorporated into the stackup of a card having very thin ceramic layer(s) to take the mechanical stress away from the very thin ceramic layer(s). The card may have openings to electronic components such as a transponder chip module. The card may have a supporting layer made of a metal core having a least one metal layer with an aperture and a slit to act as a coupling frame. The card may additionally have layers of ceramic, glass layers, polymeric materials, metallic materials, and the like.

According to the invention, generally, RFID-enabled metal transaction cards may include a specially treated thin decorative layer attached to a thick core layer of metal or metal layers (with a discontinuity to function as a coupling frame), or a combination of ceramic and metal separated by a polymeric material, wherein the thin decorative layer is designed to provide selected color(s) and/or selected texture(s) to a surface of the metal core cards. The decorative layer may comprise (a) an anodized metal layer with a discontinuity; or (b) a ceramic layer on a flexible polymeric material. The various metal layers in the stack-up construction may be fitted together, with the core or supporting metal layer protruding through an opening in the front or rear metal layer, with all of the metal layers functioning as coupling frames.

According to some embodiments (examples) of the invention, a card body for an RFID-enabled smartcard may comprise: a metal core comprising at least one layer of a metallic material having an opening for a transponder chip module and a slit extending from the opening to a peripheral edge of the metal layer to enable the metal layer to function as a coupling frame; a support layer comprising a polymer disposed on a front surface of the metal core; and a layer of ultra-thin flexible ceramic material or flexible glass disposed on the polymeric support layer. The card body may have an overall size (length and width); and the metal core and the layer of ceramic material or flexible glass may each have a size which is initially larger than the size of the card body, and may (after being laminated together) be subsequently machined to be substantially the same size as the card body.

The overall size of the card body may be dictated by the ISO ID-1 specification. The card body has a thickness; the metal core may have a thickness which is 50% to 60% of the card body thickness; the polymeric support layer may have a thickness which is 8%-12% of the card body thickness; and the ceramic material or glass may have a thickness which is 5% to 10% of the card body thickness.

The card body has a nominal ISO thickness of approximately 760 μm. The metal core may have a thickness of approximately 500 μm; the ceramic or glass layer may have a thickness of approximately 40 μm; and the support layer may have a thickness of approximately 75 μm.

The metal core, ceramic/glass and support layer account for 615 μm of the 760 μm (all numbers approximate). There may additionally be:
- a print layer, 125 μm (total 740 μm);
- an adhesive layer 25 μm (total 765 μm); and
- a laser engravable overlay layer with magnetic stripe and security elements 63 μm
- resulting in a total thickness of 828 μm prelamination, 760 μm after lamination A layer of PET or PEN may be disposed between the layer of ceramic material and the layer of metallic material, to absorb mechanical stress. Layers of adhesive may be disposed (applied on) on the front and back surfaces of the layer of PET or PEN. The layer of PET or PEN may have a thickness of approximately 25 μm; and each of the adhesive layers may have a thickness of approximately 25 μm.

The metal core and it component layers, the support layer and the layer of ceramic or glass may be bound together by a thermosetting epoxy. The metal core may comprise two layers of metallic material separated by a layer of an insulating or dielectric material.

A print layer may be disposed on a rear surface of the metal core; and an overlay layer may be disposed on a rear surface of the print layer. The print layer may have a thickness of approximately 125 μm (~15% of the total thickness). The overlay layer may be plastic, having a thickness of 60 μm with adhesive 65 μm. The overlay layer may comprise a synthetic material, such as transparent plastic, with an adhesive backing. The overlay layer may comprise a layer of ultra-thin flexible ceramic material.

Such a layer of ceramic material may have a thickness of 125 μm, or 16% of the total 760 μm thickness of the card body. For all of the thicknesses set forth herein for the various layers etc. of the card body, their thickness may also be presented (or readily calculated) as a percentage of the total thickness of the card body. For example:

Adhesive layer 25 µm: ~3.0%
Print Layer 125 µm: ~15%
Laser Engravable Overlay Layer (magnetic stripe and security elements) 63 µm: ~8%

A magnetic stripe and/or security elements may be disposed on the overlay layer

The metallic material may comprise at least one of titanium, aluminum, stainless steel and brass.

The ceramic material may comprise 3 mol % Yttria-Stabilized Zirconia (3YSZ). The ceramic material may be highly polished. A pattern or graphics laser may be etched into the ceramic material.

A holographic image may be disposed on an outer surface of the card body.

According to some embodiments (examples) of the invention, a method for making an RFID-enabled smartcard may comprise (the steps of): providing a thick metal core layer having first and second surfaces and having a discontinuity to function as a coupling frame, the thick metal core layer forming a supporting body of said transaction card, wherein the thick metal core layer has a thickness in the range of 250 microns to 500 microns; providing a thin decorative layer, on a front surface of the metal core, having a flexible polymeric backing layer, wherein the thin decorative layer and the polymeric layer together have a thickness in a range of 100 microns to 250 microns; and attaching said thin decorative layer with the polymeric backing layer to at least one of the surfaces of the thick metal core layer.

The thickness of the decorative layer may be 40 µm (ceramic), (aluminum 150 µm) polymeric=60-125 µm, and 2 layers of adhesive 25 µm may be needed—

Decorative=ceramic 40 µm or anodized aluminum 150 µm
Polymeric layer (Adhesive Dielectric (PEN or PET) Adhesive) 75 µm:
Metal core=250 µm to 500 µm The thin decorative layer may comprise ceramic material, or anodized aluminum, and may comprise a laser reactive material. A design may be applied to the thin decorative layer, such as by laser marking or etching.

According to some embodiments (examples) of the invention, a method for making RFID-enabled metal transaction cards may comprise: providing a core layer for supporting and forming a body of the card, said core layer having first and second surfaces, the core layer comprising a metal layer having a discontinuity; providing a decorative layer comprising anodized aluminum having a discontinuity; and attaching the decorative layer to the core layer.

A clear hard coat film layer or a protective coating may be disposed (provided) on the decorative layer, for scratch protection. The protective coating may be laser marked or engraved.

A ceramic coating may be provided on the metal layer.

The decorative layer and the core layer may be laminated together in a single process step.

Generally, all of the layers of a card body described herein may be laminated together in a single process step, with the exception that a multilayer (two or more metal layers, separated by insulating/dielectric layer(s)) core may be laminated separately from the process of laminating all of the other layers to the core.

According to an embodiment of the invention, a metal transaction card may comprise one or more ceramic layers which is/are extremely thin, while the supporting metal layer or layers forming the metal core (or metal interlayer) is/are extremely thick, within the dimensional confinements of ISO standard transaction cards.

According to an embodiment of the invention, a metal transaction card may comprise a ceramic layer which is extremely flexible and can withstand bends of the card body during normal wear and tear.

According to an embodiment of the invention, a metal transaction card may comprise a metal core, having a single layer of metal with a slit or several layers of metal with slits of different orientation, functions as a coupling frame for contactless communication.

The ceramic containing transaction card with contactless functionality disclosed herein may comprise a thin layer of ceramic assembled to a polymeric carrier layer such as PET or PEN for lamination to a metal layer with a discontinuity. An adhesive layer may be used to adhere the thin layer of ceramic to the PET or PEN layer, and another adhesive layer to the metal layer. Said ceramic containing transaction card may also have a hard coat layer attached to the ceramic layer during the final lamination of the card stack-up assembly to protect the ceramic surface. The hard coat layer on the ceramic surface may be laser-engravable.

In an embodiment of the invention, ultra-thin flexible ceramic may be laminated or attached to a substrate layer which may be any suitable metal, such as stainless steel, bronze, copper, titanium, tungsten carbide, nickel, palladium, silver, gold, platinum, aluminum, or any alloy which gives the card most of its body (structure) and weight. Additionally, or alternatively, the substrate layer may be one or a composite of any suitable polymeric (e.g., polycarbonate, polyester, PVC, PETG, PLA, and blends thereof) and inorganic (e.g., glass, ceramic, cellulosic) material. The substrate layer may include both a layer of metal connected to a second layer of polymeric or inorganic material. The substrate layer may include a plurality of bonded metal layers. The substrate layer may include fiberglass or carbon fiber.

The invention relates to the manufacture of RFID-enabled metal transaction cards having a wide range of colors achieved through anodization of the metal. A clear hard coat film layer for scratch protection may be applied to the anodized metal layer, with said hard coat film layer permitting a laser beam to pass through without thermal degradation to its surface, for the purpose of ablating the anodized metal layer. The hard coat film layer may have a pigment for coloring.

The invention also relates to transaction cards having a ceramic layer or decorative ceramic layers attached to a polymeric material assembled to a metal layer or layers forming the card body, and to allow flexing of the card body without cracking of the ceramic layer or ceramic layers.

It is an object of the invention to overcome problems associated with some prior art techniques for coloring or decorating the outside layers of the edge-to-edge metal transaction cards, and to enable the manufacture of RFID-enabled metal transaction cards and/or ceramic-metal hybrid transaction cards having a wide range of colors and textures.

Various aspects of the invention may relate to RFID-enabled metal transaction cards with a layer of anodized aluminum.

According to some embodiments (examples) of the invention, RFID-enabled metal transaction cards may include a specially treated thin decorative layer of aluminum attached to either side, or both sides, of a thick core layer of stainless steel, titanium, brass or tungsten, where the thin decorative layer is designed to provide selected color(s) and/or selected texture(s) to a surface of the transaction cards. Decorative layers for use in practicing the invention may include:
(a) an anodized metal layer; or
(b) a layer of ink backed onto a metal layer; or
(c) a ceramic layer on a polymeric layer attached to an underlying metal layer.

The manufacture of RFID-enabled metal transaction cards in accordance with the invention includes the preparation and treatment of a generally thin decorative layer and attaching the decorative layer to a thick metal substrate; where the thin decorative layer is designed to provide selected color(s) and/or selected texture(s) primarily to the front surface of the metal cards but also to the back surface of the cards. Each conductive layer in the card stack-up construction has a slit to function as a coupling frame, for the purpose of facilitating contactless communication with a reader.

Where the thin decorative layer is an anodized metal layer, the metal layer may be prepared and treated to have a selected color for imparting the coloring to the transaction card. Adding color (colorizing) to metal layers by anodizing is preferable to the PVD process for several reasons. Anodizing is an electrochemical process that converts the metal surface into a decorative, durable, corrosion-resistant, anodic oxide finish. Thus, coloring a metal by anodizing is highly desirable. Aluminum is ideally suited to anodizing. However, other nonferrous metals, such as magnesium, titanium, zinc, niobium, tantalum, or any other metal which can be anodized, can be used to practice the invention. Each of the decorative layers which are electrically conductive may have a discontinuity to function as a coupling frame.

A clear hard coat film layer that accepts the absorption and/or passage of a laser beam may be applied to the surface of the anodized aluminum for scratch protection. The anodized aluminum layer may be CNC engraved with logos or information prior to the application of the clear hard coat film layer.

According to some embodiments (examples) of the invention, the color and/or texture of an anodized layer may be further modified by: (a) dying the anodized layer with a single color or multiple colors, or (b) by printed graphics through techniques such as screen printing, dye sublimation printing, or any digital print system.

The anodized metal layer may be further modified through techniques such as laser engraving, CNC mechanical engraving, diamond cutting or embossing. The anodized metal layer may be used on the transaction card as a full faced material (i.e., extending the full length and width of the card, i.e. edge to edge), as an insert, a patch, a stripe, or other form having a decorative design. The anodized metal may be laser marked, or otherwise engraved or marked such that base or noble metals may be electroplated to the anodized surface in a selective pattern or flood coat.

Also, various ceramic materials on a polymeric material having selected texture and color may be used to form decorative layers attached to a metal substrate.

The exposed metal edges may be textured using a laser or by mechanical means which are prepared and treated to provide unique and/or selected texture to the metal surface.

Transaction cards embodying the invention may include a pocket formed in the top or bottom surface of the card to enable the placement therein of one or more electronic components, in particular a dual interface (DI) transponder chip module (TCM).

Metal layers forming a card body fit together, one layer fitting into a recess in an adjacent layer (this may be referred to as "slotting" together), to form a stable structure. A base or core metal layer may protrude through an upper or lower metal layer with an opening sized to fit said protrusion.

The transaction cards disclosed herein may be dual interface smartcards which can be interrogated in contactless or contact mode. The invention may also relate to innovations in or improvements to contactless only metal-containing transaction cards or contact only metal-containing transaction cards.

In their various embodiments, the invention(s) described herein may relate to industrial and commercial industries, such RFID applications, payment transaction cards (metal, ceramic, plastic or a combination thereof), electronic credentials, identity cards, loyalty cards, access control cards, and the like.

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGs). The figures may generally be in the form of diagrams. Some elements in the figures may be stylized, simplified or exaggerated, others may be omitted, for illustrative clarity.

Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

Some elements may be referred to with letters ("AS", "CBR", "CF", "MA", "MT", "TCM", etc.) rather than or in addition to numerals. Some similar (including substantially identical) elements in various embodiments may be similarly numbered, with a given numeral such as "310", followed by different letters such as "A", "B", "C", etc. (resulting in "310A", "310B", "310C"), and may collectively (all of them at once) referred to simply by the numeral ("310").

Figure 1A:
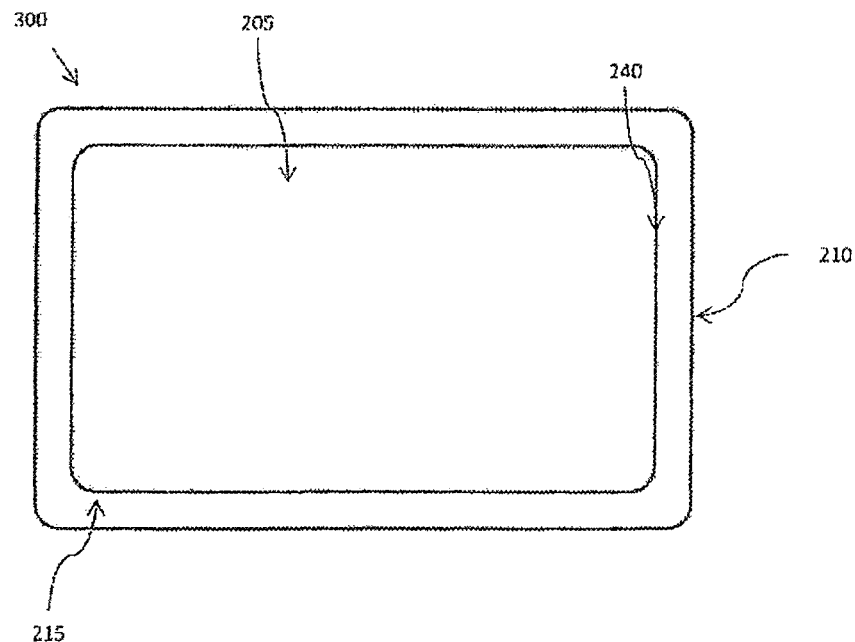

FIG. 1A (compare FIG. 1A of 62/914,485 filed 3 Oct. 2019; and FIG. 3A of 2017/0316300) is a diagram (plan view) of an exemplary transaction card comprising a ceramic layer set into a pocket in a substrate, according to the prior art.

Figure 1B:
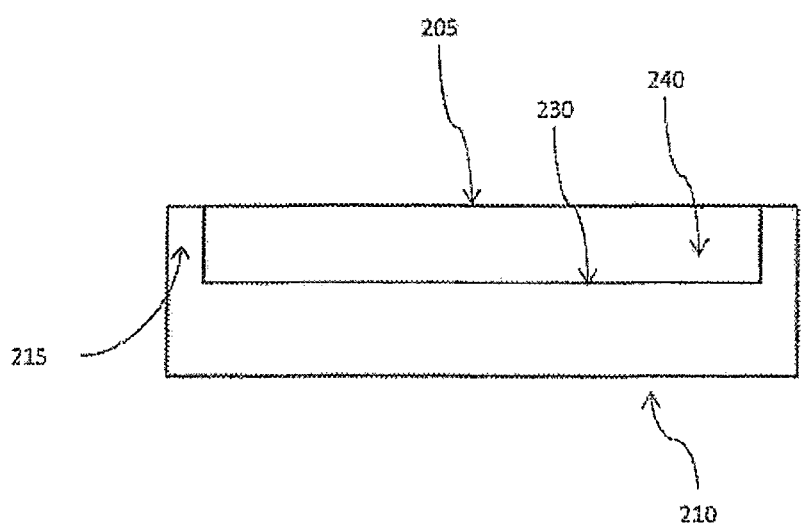

FIG. 1B (compare FIG. 1B of 62/914,485 filed 3 Oct. 2019; and FIG. 3B of 2017/0316300) is a diagram (cross-sectional view) of the exemplary transaction card of FIG. 1A, according to the prior art.

Figure 1C:
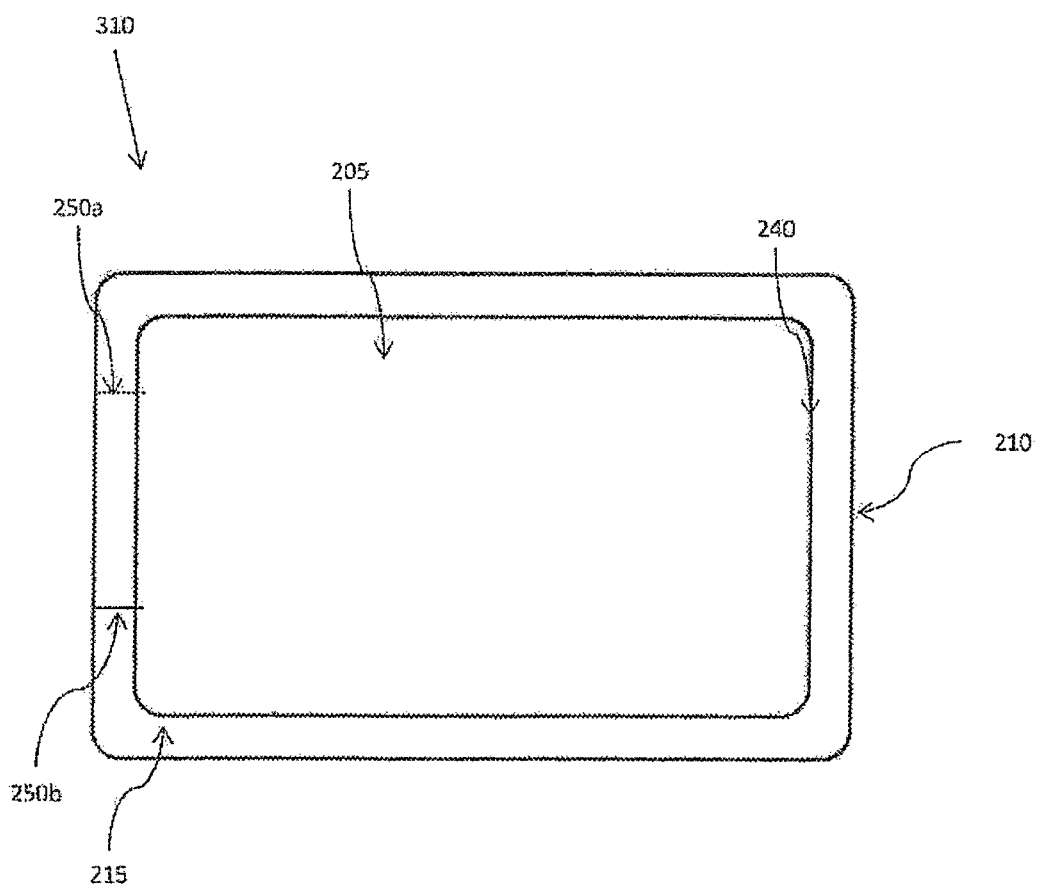

FIG. 1C (compare FIG. 1C of 62/914,485 filed 3 Oct. 2019; and FIG. 3C of 2017/0316300) is a diagram (plan view) of an exemplary transaction card comprising a ceramic layer mounted inside a frame formed by the substrate layer, according to the prior art.

Figure 1D:
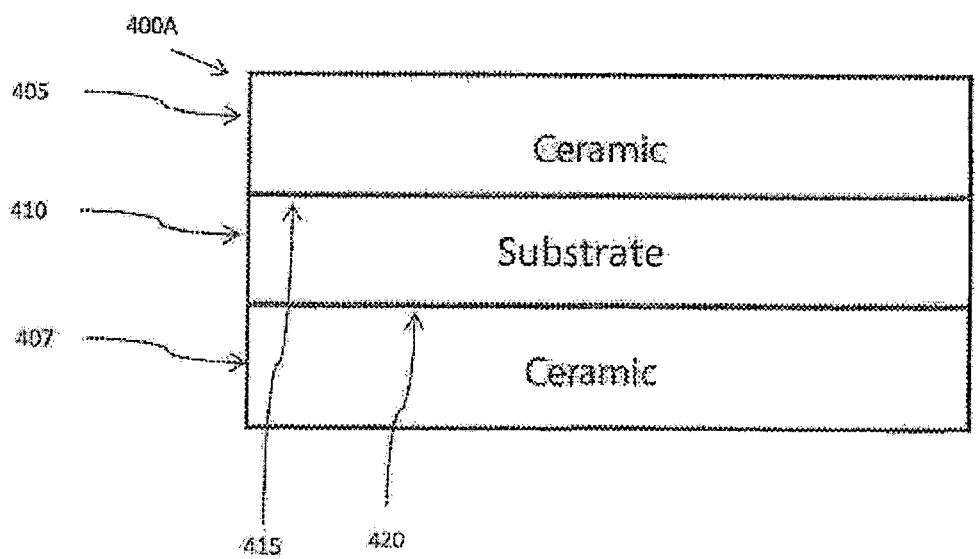

FIG. 1D (compare FIG. 2A of 62/914,485 filed 3 Oct. 2019; and FIG. 4A of 2017/0316300) is a diagram (cross-sectional view) of an exemplary transaction card construction comprising a substrate layer, a first ceramic layer and a second ceramic layer, according to the prior art.

Figure 1E:
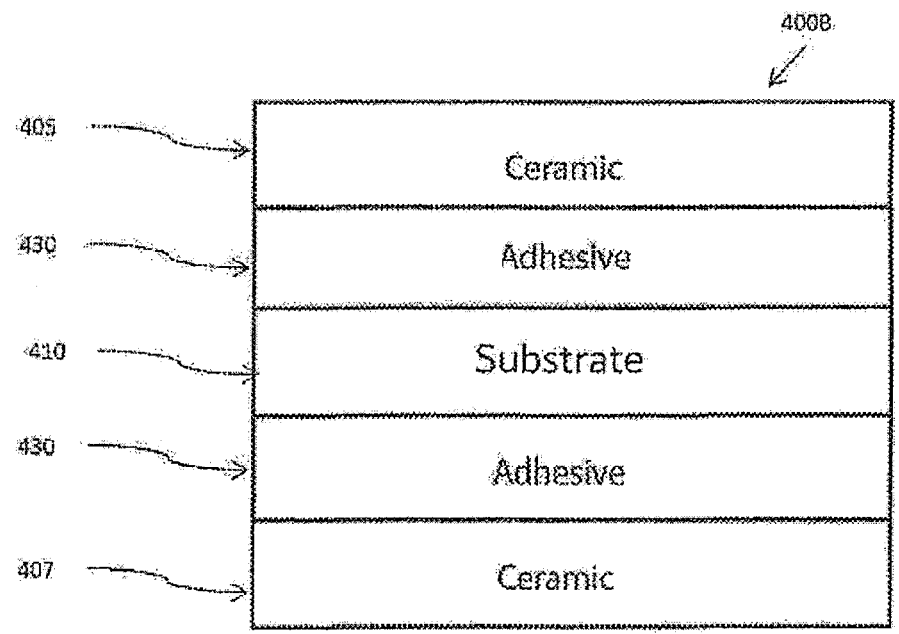

FIG. 1E (compare FIG. 2B of 62/914,485 filed 3 Oct. 2019; and FIG. 4B of 2017/0316300) is a diagram (cross-sectional view) of another exemplary transaction card construction comprising a substrate layer, a first ceramic layer and a second ceramic layer.

Figure 2A:
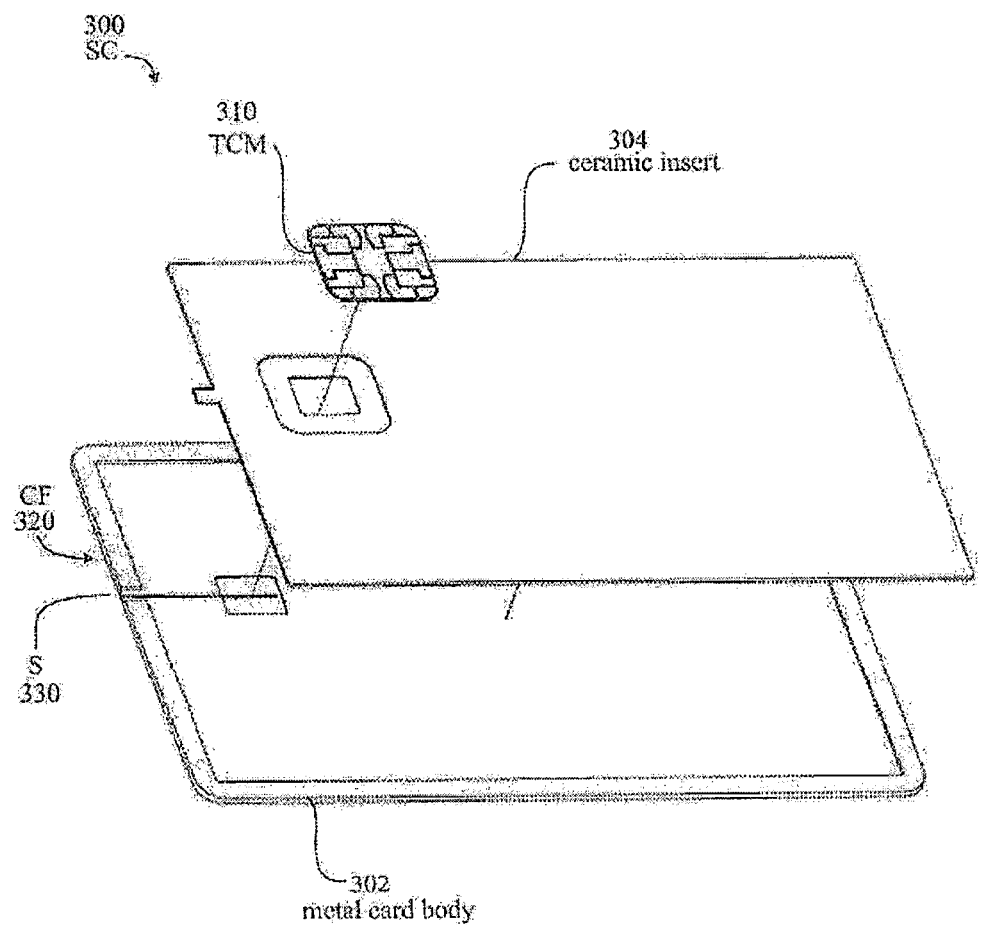
Figure 3A:
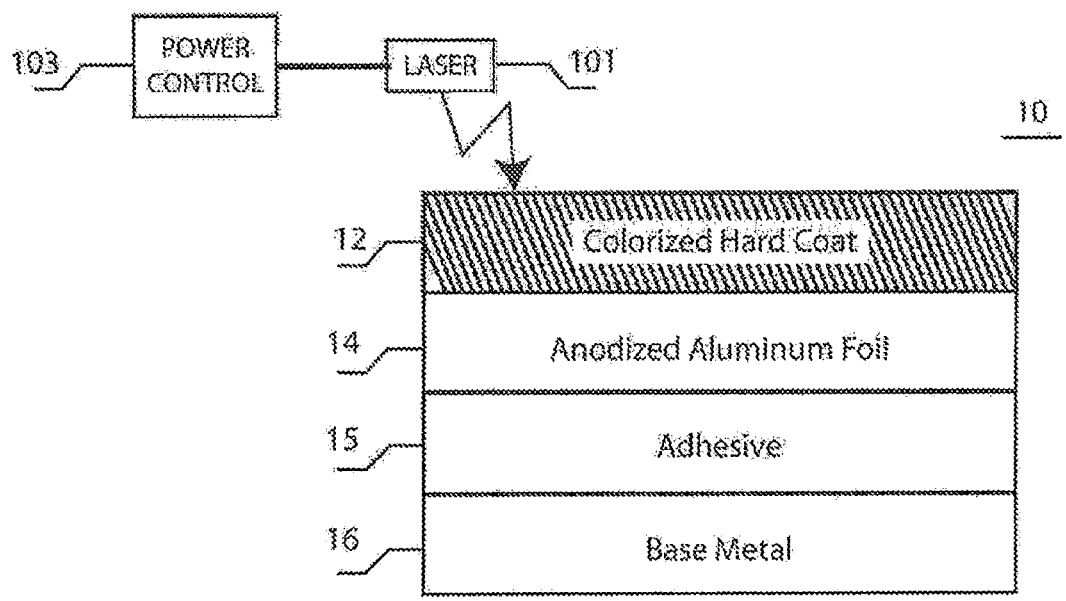
Figure 3B:
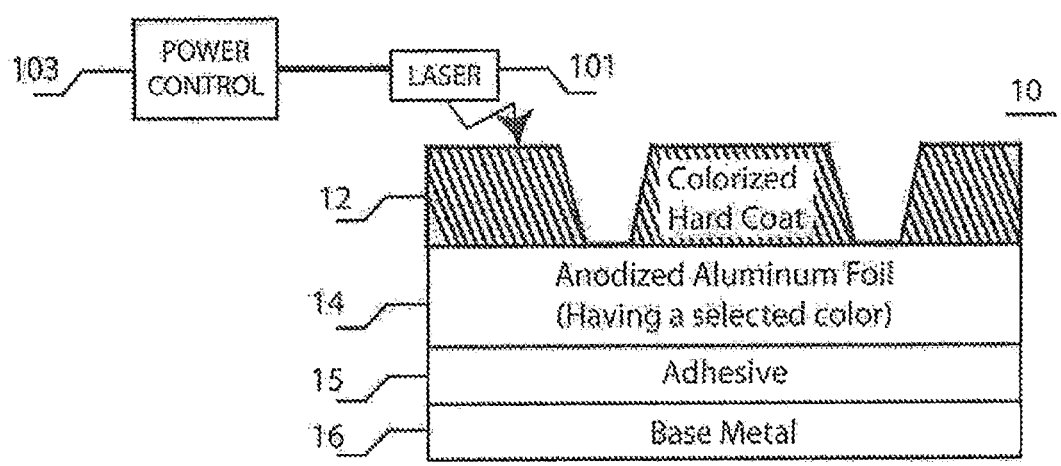
Figure 3C:
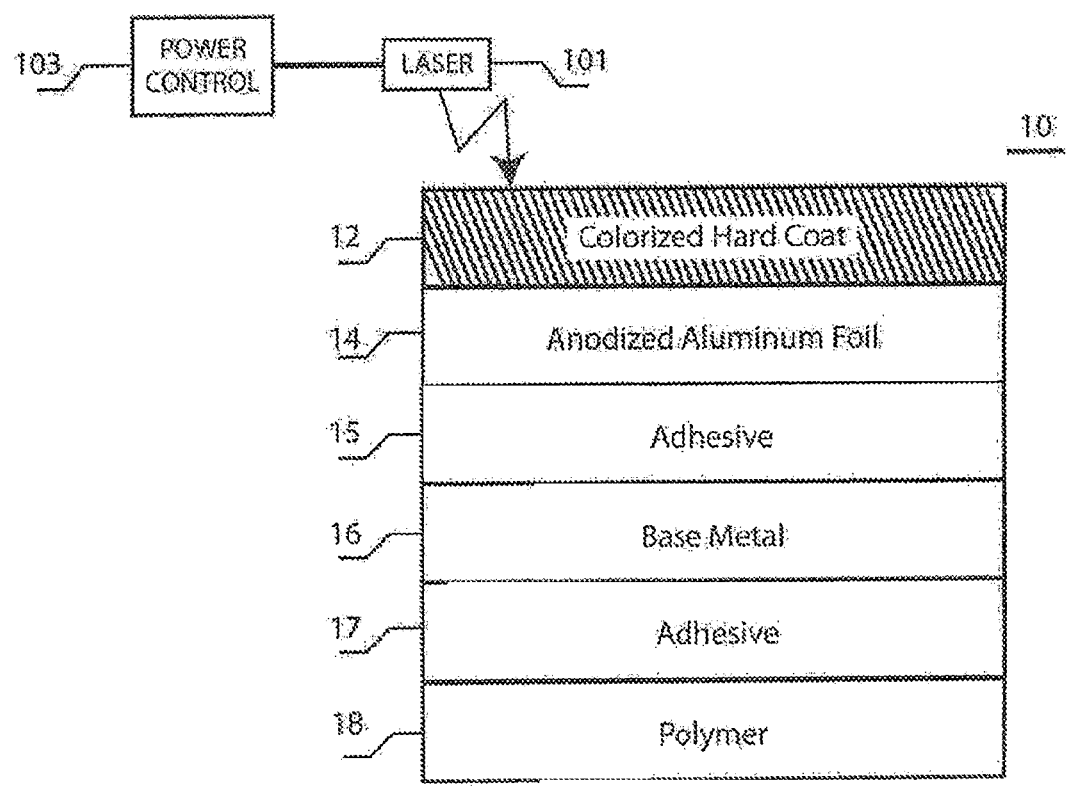
Figure 3D:
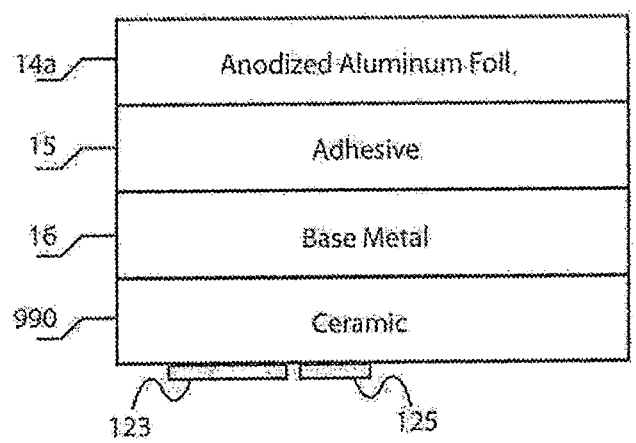

FIG. 2A (compare FIG. 3D of U.S. Pat. No. 9,697,459; 4 Jul. 2017; Finn et al.) is a diagram (perspective view, exploded) of a hybrid ceramic and metal smart card, according to the prior art.

Figure 2B:
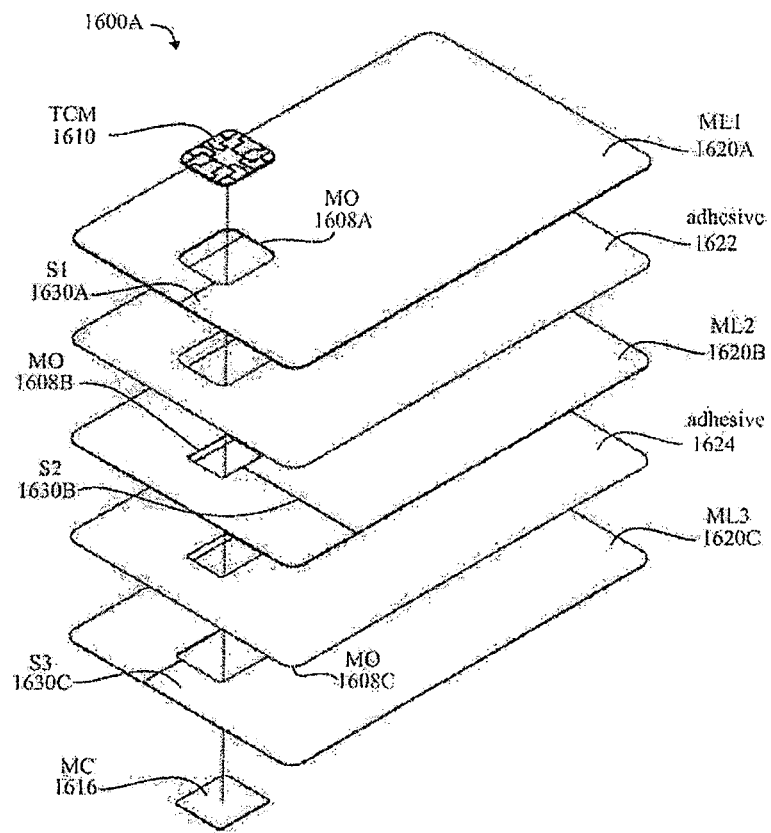

FIG. 2B (compare FIG. 3 of 62/914,485 filed 3 Oct. 2019; and FIG. 16A of U.S. Pat. No. 9,836,684) is a diagram (perspective view, exploded) of a metal laminated transaction card (RFID device) having multiple metal layers with slits, according to the prior art.

FIG. 3A (compare FIG. 1 of 62/927,157 filed 29 Oct. 2019; and FIG. 1 of US 2017/0098151) is a cross sectional diagram of colored layers combined to form a metal card with controlled coloring, according to the prior art.

FIG. 3B (compare FIG. 1A of 62/927,157 filed 29 Oct. 2019; and FIG. 1A of US 2017/0098151) is a cross sectional diagram illustrating the removal of portions of the top layer of the card shown in FIG. 1 displaying different colors, according to the prior art.

FIG. 3C (compare FIG. 2 of 62/927,157 filed 29 Oct. 2019; and FIG. 2 of US 2017/0098151) is a cross sectional diagram of selected layers used to form a card having metal and polymeric layers, according to the prior art.

FIG. 3D (compare FIG. 3 of 62/927,157 filed 29 Oct. 2019; and FIG. 11C of US 2017/0098151) is a cross sectional diagram showing that the layers attached to the top and bottom surfaces of a metal substrate may be different, according to the prior art.

Figure 4A:
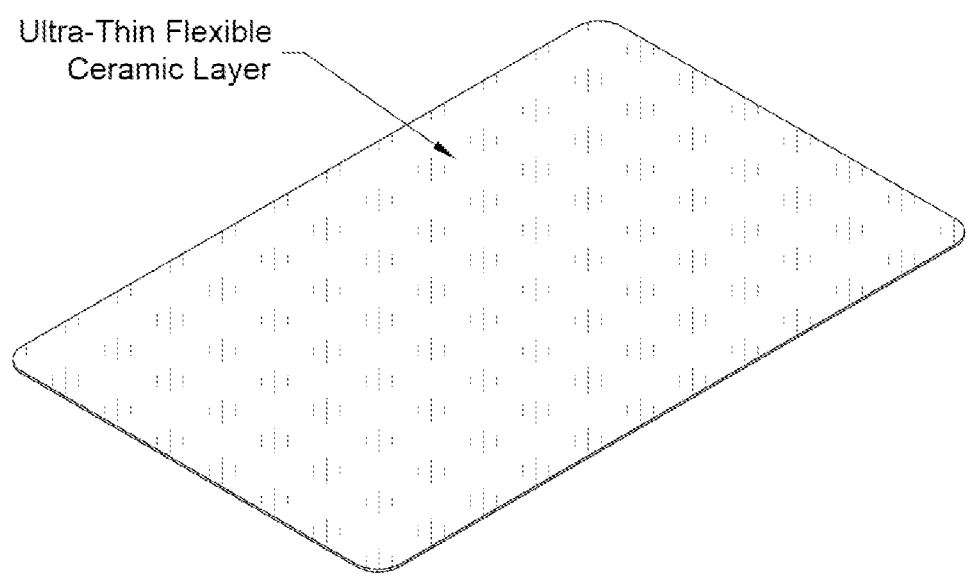

FIG. 4A is a perspective view of an ultra-thin ceramic tile with a thickness of 40 μm, such as may be used in some embodiments of the invention.

Figure 4B:
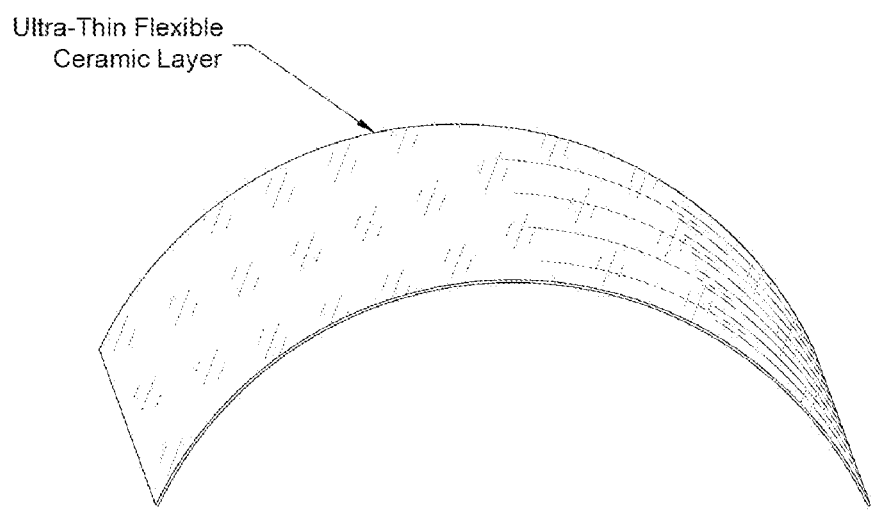

FIG. 4B (compare FIG. 4A of 62/914,485 filed 3 Oct. 2019 (FCS 003)) is a drawing (plan view) of an exemplary self-supporting layer of ultra-thin flexible ceramic, according to the invention.

Figure 5A:
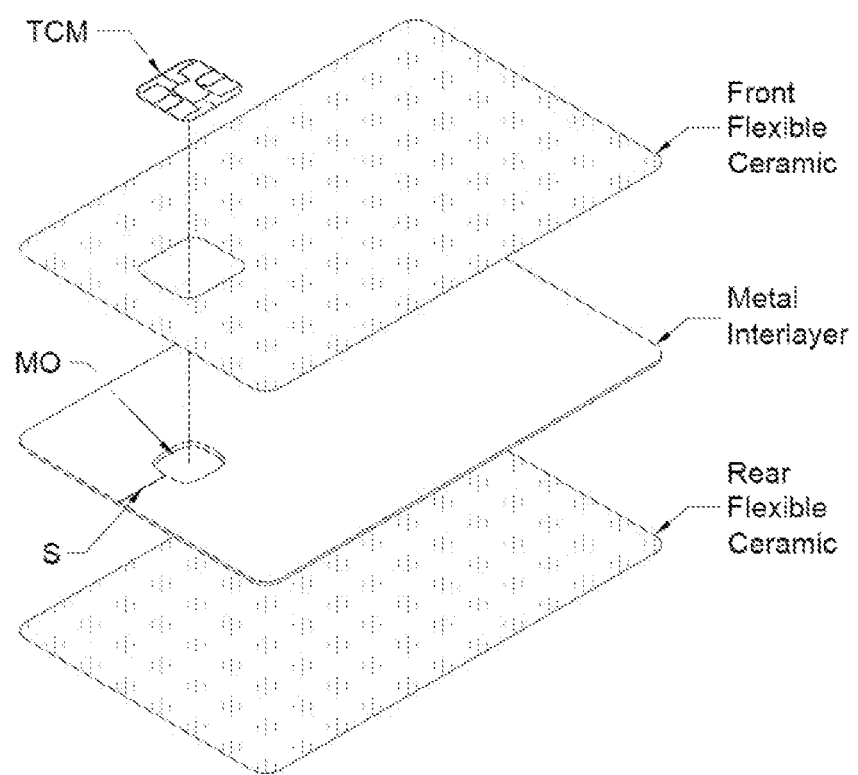

FIG. 5A (compare FIG. 5A of 62/914,485 filed 3 Oct. 2019 (FCS 003)) is a diagram (cross-section, exploded, and partially perspective), of a RFID metal transaction card showing a lay-up (or stacking) of layers for a ceramic-containing smartcard construction. A transponder chip module (TCM) for inserting in openings (apertures or recesses) in the layers of the transaction is shown, according to the invention.

Figure 5B:
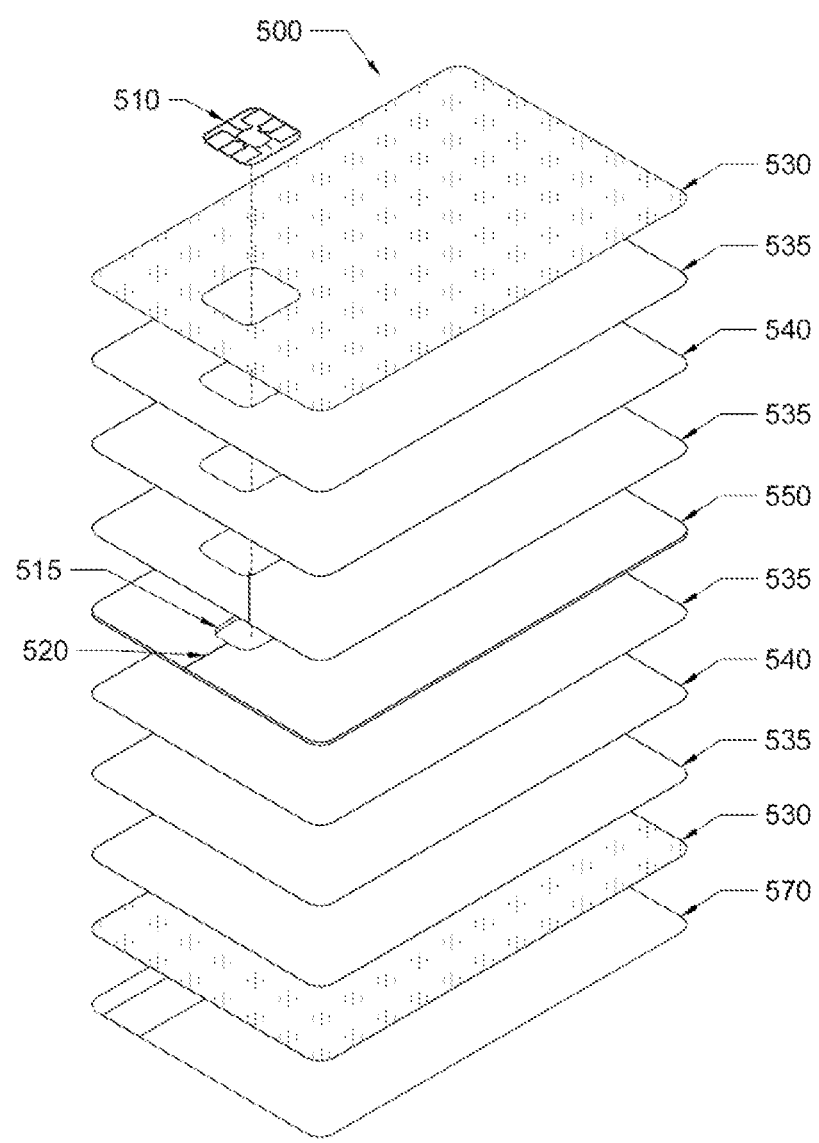

FIG. 5B is a detailed diagram of the stack-up construction of a card body having ultra-thin layers of ceramic sandwiching a metal interlayer, with the ceramic layers laminated to a synthetic layer of PET or PEN to absorb the mechanical stress when the card body is flexed, according to the invention.

Figure 5C:
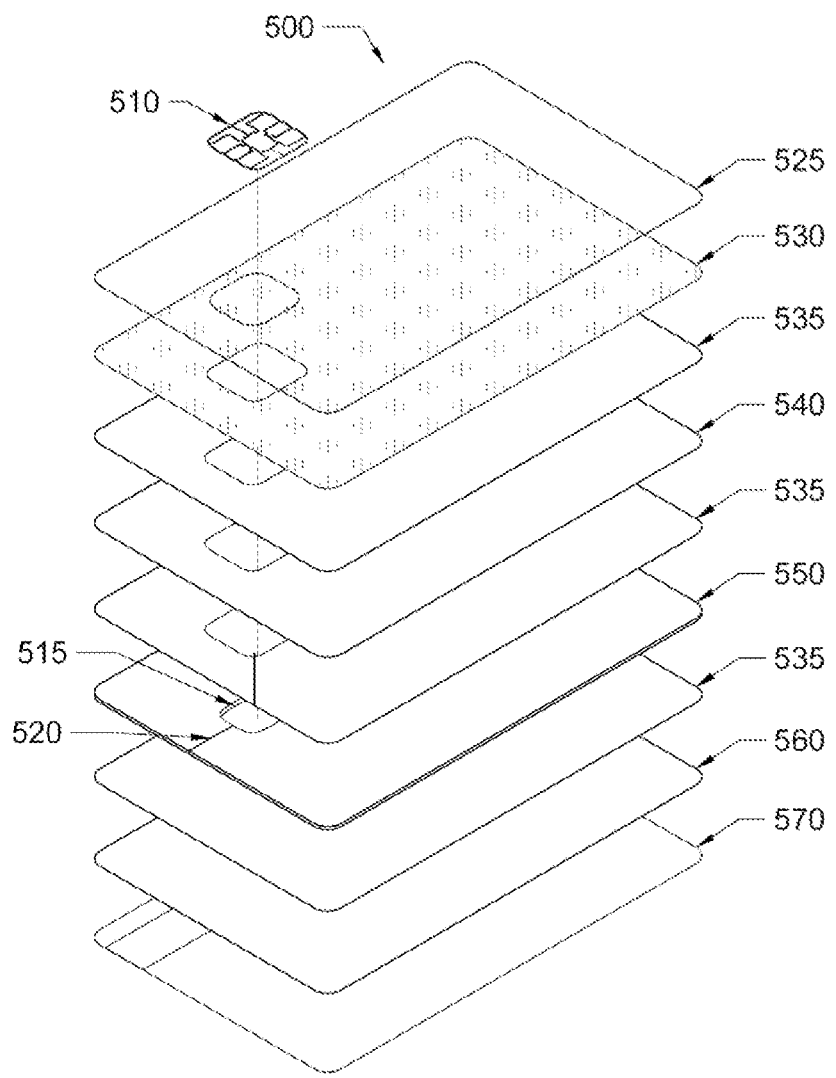

FIG. 5C shows the stack-up construction of a ceramic face metal card with an ultra-thin layer of flexible ceramic laminated to a supporting and shock absorbing synthetic layer assembled to a metal interlayer having rear plastic layers for incorporating graphic artwork, magnetic stripe and the security elements, according to the invention.

Figure 5D:
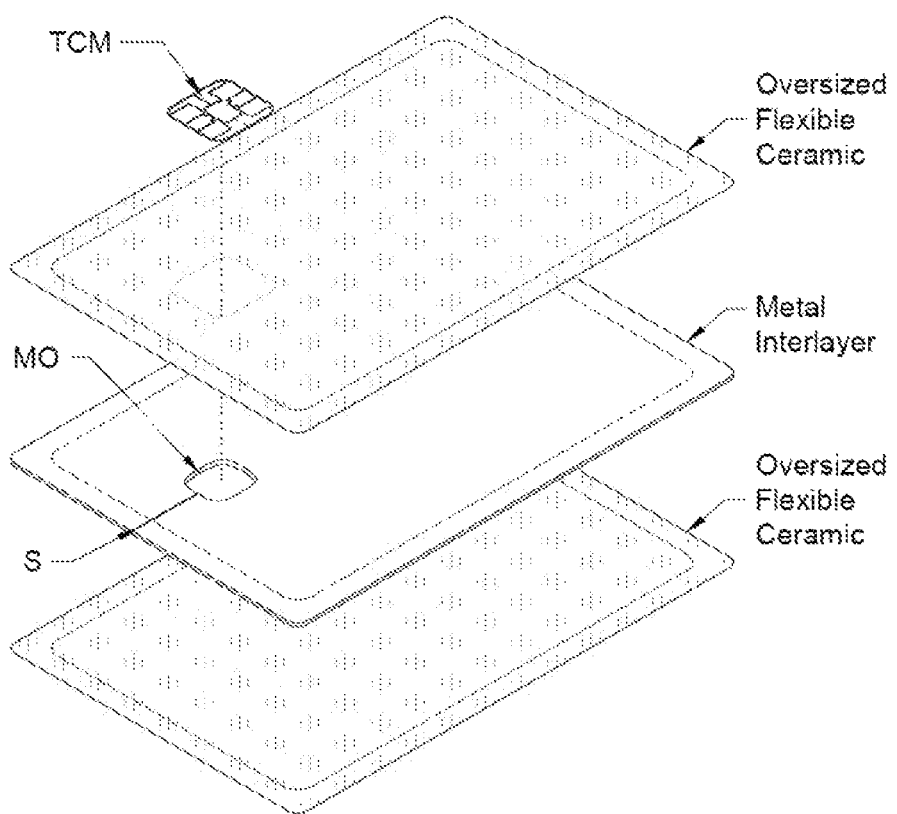

FIG. 5D shows the stack-up construction of a ceramic containing transaction card with two oversized flexible ceramic layers sandwiching a metal interlayer, according to the invention.

Figure 5E:
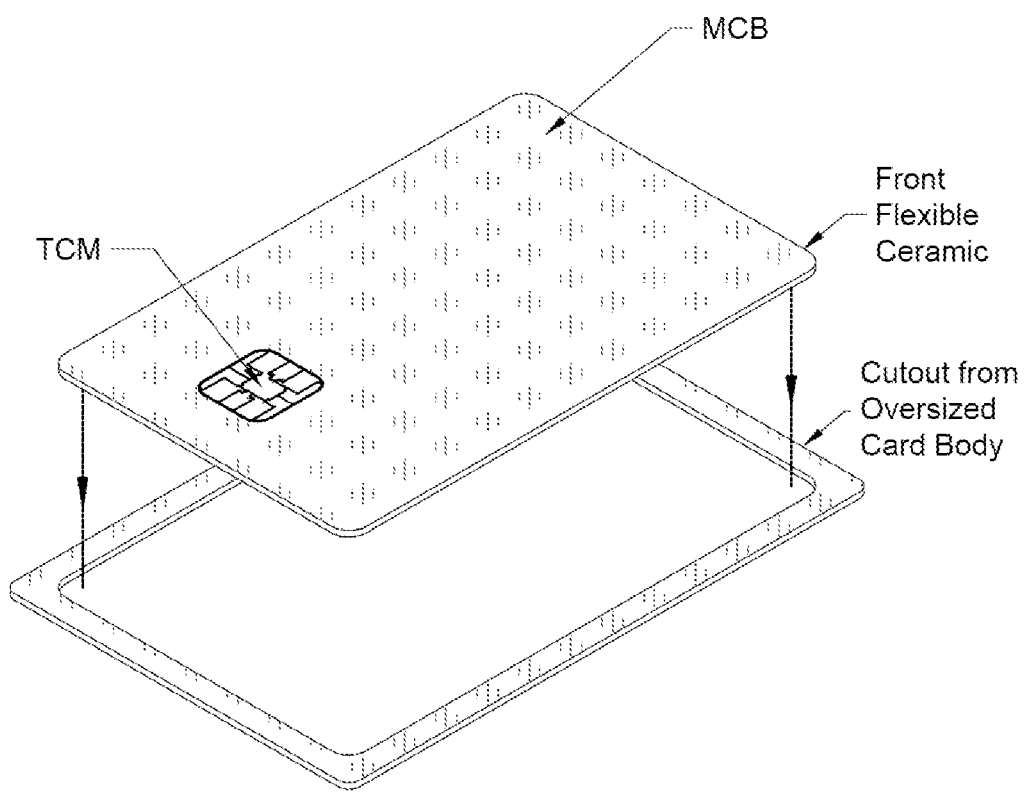

FIG. 5E shows a ceramic card body (CCB) in ISO dimensions which has been machined out from a laminated oversized card body as illustrated in FIG. 5D, according to the invention.

Figure 6:
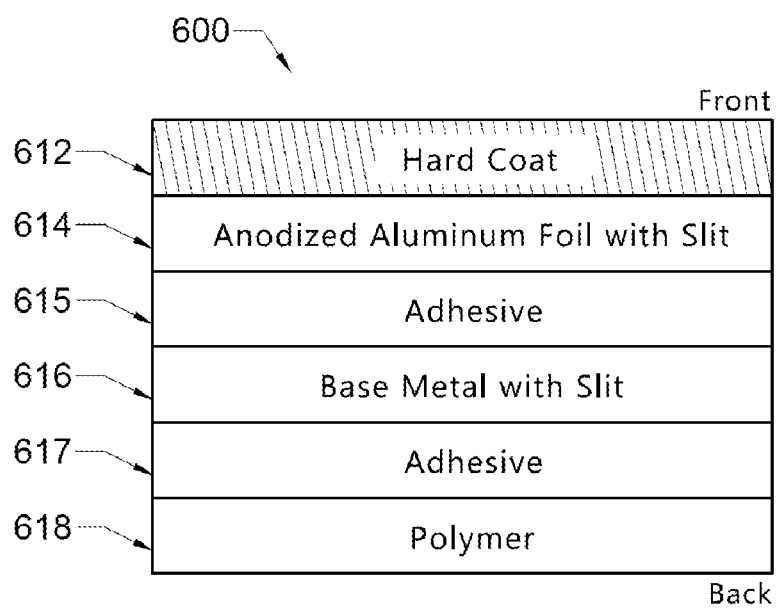

FIG. 6 (compare FIG. 4 of 62/927,157 filed 29 Oct. 2019) is a diagram (cross-sectional view) of selected layers used to form a transaction card having metal and polymeric layers, with said metal layers having a slit to function as a coupling frame for contactless communication, according to the invention.

Figure 7:
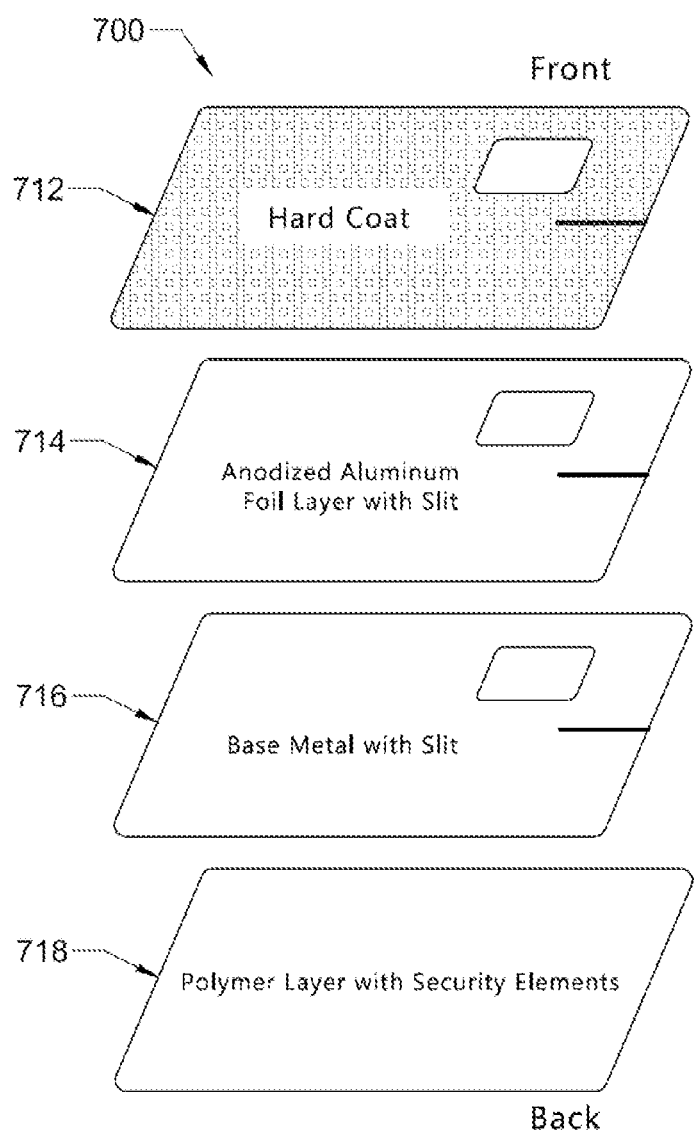

FIG. 7 (compare FIG. 5 of 62/927,157 filed 29 Oct. 2019) is a diagram (exploded perspective view) of the layers and components of a transaction card of the type shown in FIG. 6 (except that the adhesive layers have been omitted), according to the invention.

Figure 8:
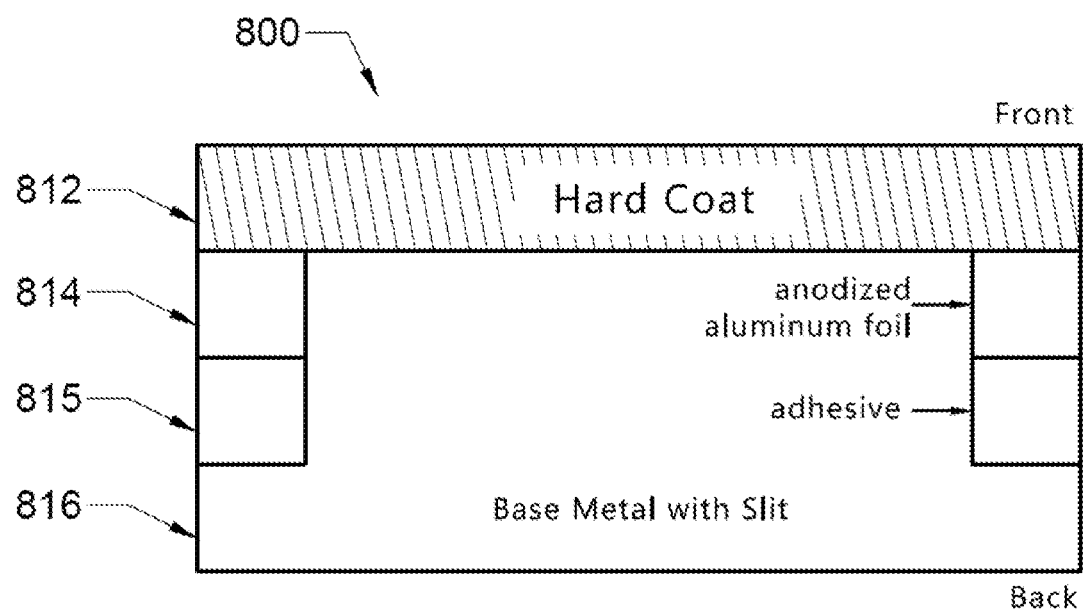

FIG. 8 (compare FIG. 6 of 62/927,157 filed 29 Oct. 2019) is a diagram (cross-sectional view) of a stack-up construction used to form a transaction card having integrated metal layers, with said metal layers having a slit to function as a coupling frame for contactless communication, according to the invention.

Figure 9:
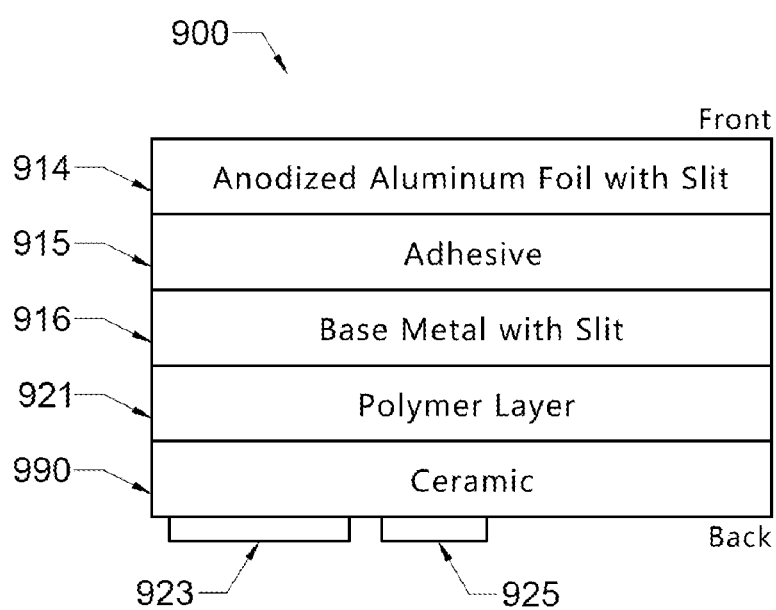

FIG. 9 (compare FIG. 7 of 62/927,157 filed 29 Oct. 2019) is a diagram (cross-sectional view) showing a combination of different material layers attached to the top and bottom surfaces of a metal supporting substrate, according to the invention.

DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein.

Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Reference may be made to disclosures of prior patents, publications and applications. Some text and drawings from those sources may be presented herein, but may be modified, edited or commented to blend more smoothly with the disclosure of the present application.

FIGS. 1A and 1B depict an exemplary transaction card 300 deploying another manner of connecting first ceramic layer 205 and substrate layer 210. The first ceramic layer 205 is an insert set into a pocket 240 (which may be created using, e.g., machining, lasering, milling) in first side 215 of substrate layer 210. An adhesive 230 may be used to adhere first ceramic layer 205 and substrate layer 210. Suitable adhesives may include epoxies, cyanoacrylate, acid modified polyolefin, silicone elastomers, and other naturally occurring adhesives.

The first ceramic layer 205 is press-fit into pocket 240 in substrate layer 210. Press-fitting is intended to refer to any suitable means by which the ceramic insert is geometrically secured into pocket 240 in substrate layer 210. For example, one method of press-fitting includes "dove tailing" (not shown), in which one or more shapes in the edge of first ceramic layer 205 interlock with mating shapes in the inner edge of substrate layer 210. For example, a male feature in first ceramic layer may fit into a female receptor in the substrate, the ceramic layer may have a female receptor sized to receive a male feature in the substrate, or a combination thereof.

Turning to FIG. 1C, for connecting first ceramic layer 205 to substrate layer 210 is depicted with respect to exemplary transaction card 310. The substrate layer 210 includes one or more tapped holes 250a,b such that substrate layer 210 acts as a frame, in which set screws disposed in the tapped holes hold first ceramic layer 205 within pocket 240.

FIGS. 1D and 1E depict cross-sectional diagrams of exemplary transaction cards 400A and 400B respectively. The transaction card 400A includes a substrate layer 410 having a first side 415 and a second side 420.

First ceramic layer 405 is connected to first side 415 of substrate layer 410. Second ceramic layer 407 is connected to second side 420 of substrate layer 410.

FIG. 2A illustrates a design of a hybrid ceramic and metal smart card (SC) 300. The card body (CB) 302 may be made of solid metal and feature a slit (S) 330 at the position of the transponder chip module (TCM) 310. The card body with slit may function as a coupling frame (CF) 320, with the slit overlapping the module antenna of the transponder chip module. The metal card body may feature a recess that may cover most of the size of the card and extend around the slit position to the periphery of the card. This recess may be filled by gluing or laminating a moulded or cut ceramic insert 304. This allows the card to retain the mechanical strength of the metal (e.g. stainless steel, titanium, tungsten) and have the aesthetic appearance and appeal of a polished ceramic finish.

Metal Laminated Cards

FIG. 2B illustrates a metal laminated transaction card (RFID device) 1600A, generally comprising (from top-to-bottom, as viewed): an 8 pin transponder chip module (TCM) 1610, a first, top (front) metal layer (ML1) 1620A which may have a thickness of approximately 300 μm or 320 μm, and a slit (S1) 1630A is shown extending from the left edge of the card to an opening (MO) 1608A for the transponder chip module (TCM). The front layer may comprise titanium. a layer of non-conductive adhesive 1622 which may have a thickness of approximately 20 μm (if the front layer is 320 μm). A thicker layer (40 μm) or two 20 μm layers of adhesive may be used if the front layer is 300 μm; a second, middle (inter-) metal layer (ML2) 1620B which may have a thickness of approximately 200 μm. A slit (S2) 1630B is shown extending from the bottom edge of the card to an opening (MO) 1608B for the transponder chip module (TCM). The inter-layer may comprise titanium. A layer of non-conductive adhesive 1624 which may have a thickness of approximately 20 μm, a third, bottom metal layer (ML3) 1620C which may have a thickness of approximately 200 μm. A slit (S3) 1630C is shown extending from the left edge of the card to the opening for the transponder chip module (TCM). The bottom layer may comprise titanium. A module cover (MC) 1616 which may comprise a non-conductive material such as ceramic having a thickness of approximately 200 μm may be inserted into the opening in the bottom metal layer (ML3).

The bottom metal layer ML3 may not have an opening MO, but rather may simply have a position defined for the transponder chip module, and the slit S3 may extend into the position to overlap the module antenna. The cover (MC) may not be required.

FIG. 2B illustrates a "stack-up" of at least two metal layers having slits, in a transaction card construction. Generally, the slits of the metal layers are deployed in different positions or orientations from one another so that the slits are not aligned with one another and so that, consequently, an area without a slit of one layer may support or reinforce the slit (or slit area) of another, such as adjacent, layer.

Metal Cards with at Least One Anodized Layer

FIG. 3A illustrates a metal based transactional card 10 having a number of different colored layers. In FIG. 1, card 10 includes a colorized hard-coat top layer 12 overlying an anodized aluminum foil layer 14. The hard coat layer 12 may be attached to the anodized layer 14 by any known or suitable manner (e.g., by being bonded, sprayed on and cured, attached via an adhesive or carrier layer, or transferred from a carrier sheet). Layer 14 is attached via an adhesive layer 15 to a base metal layer 16. Layers 12 and 14 are designed to have selected colors which are used to provide the card 10 with a different colored and decorative appearance. The color of layers 12 and 14 may be combined with the color of the base metal layer 16 to provide the card with a still greater range of colors and decorative patterns.

In the manufacture of the cards, the thickness of hard coat layer 12 will typically be 2 to 50 microns, the thickness of aluminum foil layer 14 may be in the range of 0.0005 inches to 0.014 inches, and the thickness of metal layer 16 may be in the range of 0.005 inches to 0.032 inches. Note that layer 12 is optional and that layer 14 is primarily intended to provide a decorative (coloring) function.

Layer 12 provides a scratch resistance surface and can also provide a colored layer. The hard coat layer 12 may be formed of nano-particles, such as silicate nanoparticles, zinc oxide nanoparticles, silicon dioxide crystalline nano-particles, or any other suitable nano-particles with a suitable carrier such as a solvent, water based, or UV curable acrylates, vinyls, urethane or the like. The hard coat can be applied by coating techniques such as spraying, gravure, reverse roll, direct roll, or slot coating.

The hard coat layer 12 may be applied to a card, or to a subassembly used in forming a card, by means of a special carrier layer. The special carrier enables a release layer and a hard coat layer to be attached to the special carrier layer to form a subassembly which can then be attached and transferred to another subassembly to form an intermediate assembly from which the carrier and release layers can be removed, leaving the hard coat layer as the top and/or bottom layer of the card. The hard coat layer may be clear or colored. Color is added to the hard coat layer by adding pigments or dyes to either the adhesive layer or mixed with the hard coat vehicle itself.

The second layer 14 is comprised of a colored anodic metal layer which is shown to be attached via an adhesive layer 15 to a base metal layer 16. The layer 14 could also be bonded and laminated to the underlying layer 16. The anodized metal layer 14 is shown to be of aluminum.

However, the anodized layer 14 may be titanium, zinc, niobium, tantalum or any other metal which can be anodized. An anodized layer may by further modified by: (a) dying the anodized layer a single color or multiple colors, or (b) by printed graphics through techniques such as screen printing, sublimation printing, or any digital print system. The anodized metal layer 14 may be further modified through techniques such as laser engraving, mechanical engraving, die cutting, or embossing. The anodized metal layer may be used on the card as a full faced material (i.e., extending the full length and width of the card, edge to edge), as a patch, a stripe, or other decorative design.

Using a colorized anodic layer 14, instead of a polymer layer, upon a colored metal layer 16 provides more flexibility and cost savings. Use of printed anodic material to replace polymeric materials overcomes the challenges present when using polymers since the metal is denser than the polymer and does not have the minimum print thickness limitations. This composition and method may be used on all transaction and ID card types including contactless, contact, and dual interface smart cards.

The base or substrate metal layer 16 used in cards may be any suitable metal, such as stainless steel, bronze, copper, titanium, or any alloy which gives the card most of its body (structure) and weight.

The layers 12, 14, 15, and 16 may be combined in one or more lamination steps using heat, pressure, and/or UV curing. FIGS. 1 and 1A illustrate the construction of a multi layered metal transaction card where essentially the entire body of the card is metal and whose color can be controlled. A signature panel and a magnetic stripe (not shown) could be attached (directly or indirectly via a polymer layer) to the underside of metal layer 15 shown in FIGS. 1 and 1A to form a complete transaction card.

FIGS. 3A and 3B illustrates a laser 101 for applying a laser beam to a card 10. The power level of the laser 10 is controlled by a power controller 103. Controlling the power level of the laser enables the manufacture of cards whose colors can be varied and controlled. The laser can be used to ablate selected portions of the hard coat layer 12 and of the anodized layer 14. In addition, the laser can be used to change the color of the base metal layer 16 by controlling (varying) the power level and polarization of the laser (e.g., this may be termed a type of diffraction lasering). In this manner the color and texture of each card may be controlled and varied.

FIG. 3B illustrates that a desirable color contrast may be created by selectively laser ablating or engraving the top layer 12, allowing the $2^{nd}$ layer 14 to show through. This can be achieved with discrete, optimized laser parameters or engraving techniques.

Hybrid Metal-Polymer Cards

FIG. 3C illustrates a card 10 which includes the coloring layers shown in FIG. 1 and, in addition, includes a polymeric layer 18 which is attached to the underside of metal layer 16 by adhesive layer 17. The assembly comprised of layers 12, 14, 15, 16, 17 and 18 can be laminated to produce a "Hybrid" card comprising a combination of metal layers and at least one polymer layer. The polymer layer 18 may be of any suitable material (e.g., PVC, PC, PET, etc. . . . ). The polymer layer 18 may include a magnetic stripe and a signature panel. Alternatively, a magnetic stripe and a signature panel may added subsequently after the cards have been separated from the sheet on which multi cards are being formed.

Ceramic Cards

FIG. 3D illustrates an anodized aluminum foil 14a is attached via an adhesive 15 to one side (top surface) of the metal substrate 16 and a ceramic veneer layer 990 is attached to the other side (bottom surface) of the metal substrate. A signature panel 123 and a magnetic stripe 125 are shown attached to the ceramic layer 990.

FIG. 4A illustrates an exemplary self-supporting layer of ultra-thin flexible 3YSZ ceramic. The flat ultra-thin ceramic tile may have a thickness of 20 or 40 μm.

Properties of Ultra-Thin, Flexible Zirconia Ceramic
  Physical
    Material: 3 mol % Yttria-Stabilized Zirconia (3YSZ)
    Surface Roughness: 20-25 nm
    Density: 6.04 g/cm3, 99% dense
    WVTR: $1.5 \pm 0.9 \times 10^{-6}$ g/m$^2$/day (45° C./85% RH)
  Mechanical
    Bend Strength: 1.2 GPa, measured on 2 cm strip, 20 microns
    Tensile Strength: 248 MPa @RT Multiple metal layers each with a slit of different orientation, to function as individual coupling frames, may be used in ceramic-containing transaction cards for reinforcement. For example, a ceramic face metal transaction card may have an ultra-thin layer of ceramic on the top face of the card, followed by supporting metal layers, and with a rear synthetic layer such as an overlay layer to capture (support) the magnetic stripe on the back. A hologram and signature panel may be hot-stamped to the overlay layer.

FIG. 4B illustrates an exemplary self-supporting layer of ultra-thin flexible ceramic with a thickness of 40 μm. The flexible ceramic tile can be applied to an underlying synthetic layer with adhesive which further enhances the flexibility without cracking the ceramic tile.

FIG. 5A illustrates a transponder chip module (TCM) positioned above a transaction card body comprising:
  a card front (top) flexible ceramic layer,
  a metal interlayer having a slit to function as a coupling frame, and
  a card back (rear) flexible ceramic layer.

This construction may use a 20 μm or 40 μm thick front (top) layer, with an opening for the transponder chip module (TCM). The front layer may be made from non-conductive material such as ultra-thin flexible ceramic.

The metal interlayer (coupling frame) or metal core (having at least one metal layer) may have a thickness in the range of 450 μm to 550 μm and features a slit of width typically greater than 50 μm extending from the edge of the metal interlayer to an opening for the transponder chip module (TCM). The opening in the interlayer dictates the overlap of the interlayer with the module antenna (MA) and may be optimized to maximize the RF performance of the card when communicating with a reader.

The metal interlayer acts as a reinforcing structure for the card and can be chosen to increase the weight of the card by using a high density metal or metal alloy. The use of an optimally designed slit and cavity in the metal interlayer enhances the performance of the transponder chip module (TCM) by coupling induced eddy currents in the interlayer to the module antenna (MA) of the transponder chip module (TCM).

The rear layer may have a thickness of 40 μm (in the case of ultra-thin flexible ceramic) or 50 μm (in the case of an overlay material) and may have an optional recess to accommodate the structures on the rear side of the transponder chip module (TCM) that include the RFID chip (IC), wire bond connections and encapsulation. Depending on the design thickness of the transponder chip module (TCM), a recess in the rear layer may be omitted. Not shown are adhesive layers between each layer with thickness typically in the range of 25 µm to 75 µm.

In the coupling frame layer (metal layer with slit and opening) shown herein, the opening in the coupling frame layer is typically smaller than the opening in the top (front layer) to ensure that the slit in the coupling frame overlaps the module antenna in the transponder chip module.

To provide mechanical stability to the ceramic containing transaction card, a layer of PET, PEN or any suitable synthetic material may be laminated to the ceramic using an adhesive. The subassembly may be further laminated to a metal layer.

FIG. 5B illustrates the stack-up construction of the card body presented in FIG. 5A having ultra-thin layers of ceramic sandwiching a metal interlayer (core), with the ceramic layers laminated to a synthetic layer of PET or PEN to absorb the mechanical stress when the card body is flexed. The metal interlayer has a slit (S), a module opening (MO) to accept the insertion of a transponder chip module.

The stack-up construction of the card body 500 with ceramic laminated to both sides may comprise the following layers:
500: Card body (CB) or smartcard (SC)
510: Transponder chip module (TCM)
515: Module opening
520: Slit (S)
530: Very thin layer of ceramic typically (20 or 40 µm)—front face
535: Adhesive layer (25 µm)—thermosetting epoxy
540: A PET or PEN layer (25 µm) to absorb mechanical stress of the ceramic from flexing
535: Adhesive layer (25 µm)—thermosetting epoxy
550: Metal layer or layers with slit (500-550 µm)
535: Adhesive layer (25 µm)—thermosetting epoxy
540: A PET or PEN layer (25 µm) to absorb mechanical stress of the ceramic from flexing
535: Adhesive layer (25 µm)—thermosetting epoxy
530: Very thin layer of ceramic typically (20 or 40 µm)—rear face
570: Optional overlay layer with magnetic stripe (60 µm)

FIG. 5C illustrates the stack-up construction of a ceramic face metal card with an ultra-thin layer of flexible ceramic laminated to a supporting and shock absorbing synthetic layer mounted to a metal interlayer having rear plastic layers assembled thereto for graphic artwork and for the application of the magnetic stripe and security elements (hologram and signature panel).

The stack-up construction of a ceramic face metal card (500) may comprise the following:
500: Card body (CB) or smartcard (SC)
510: Transponder chip module (TCM)
515: Module opening
520: Slit (S)
525: Optional protective hard coat (5-10 µm)—Laser reactive layer
530: Very thin layer of ceramic typically (20 or 40 µm)—front face
535: Adhesive layer (25 µm)—thermosetting epoxy
540: A PET or PEN layer (25 µm) to absorb mechanical stress of the ceramic from flexing
535: Adhesive layer (25 µm)—thermosetting epoxy
550: Metal layer or layers with slit (450-550 µm)
535: Adhesive layer (25 µm)—thermosetting epoxy
560: Print layer (125) µm with graphics
570: Overlay layer with magnetic stripe (60 µm) and security elements A Ceramic Face Metal Transaction Card may have a card body comprising the following layers (thickness and percentage of overall card body thickness set forth—all approximate):
Front Ceramic layer (40 µm): ~5.0%
Polymeric layer (Adhesive Dielectric (PEN or PET) Adhesive) 75 µm: ~9.0%
Metal core 500 µm: ~60%
Adhesive layer 25 µm: ~3.0%
Print Layer 125 µm: ~15%
Laser Engravable Overlay Layer (magnetic stripe and security elements) 63 µm: ~8%
Total 828 µm—Prelamination FIGS. 5D and 5E present the manufacturing technique of laminating oversized ceramic tiles to synthetic layers and a metal interlayer and then machining the oversized laminate to produce an ISO compliant card body. This method enables accurate alignment of the individual layers with precise edges which has not been considered by the prior art.

FIG. 5D shows the stack-up construction of a ceramic containing transaction card with two oversized flexible ceramic layers sandwiching a metal interlayer (core).

FIG. 5E shows a ceramic card body (CCB) in ISO dimensions which has been machined out from a laminated oversized card body as illustrated in 5D. Machining may comprise CNC milling.

Contactless, Contact or Dual Interface Transaction Cards

FIG. 6 illustrates an exemplary stack-up of layers for a card 600, from a front surface (side) of the card to a rear surface (side) of the card:
element 612: hard coat layer or protective coating (ink, varnish or a polymer) which can be laser marked or engraved
element 614: anodized aluminum foil with a slit to function as a coupling frame
element 615: Adhesive layer of thermosetting epoxy
element 616: base metal layer of stainless steel with a slit
element 617: Adhesive layer of thermosetting epoxy
element 618: Polymeric layer (rear face)
Compare FIG. 3C.

FIG. 6 illustrates an RFID-enabled transaction card 600 embodying the invention which includes a clear hard coat film layer 612, an anodized aluminum foil layer 614 with a discontinuity to function as a coupling frame, an adhesive layer 615, a base metal layer with slit 616 and a polymeric layer 618 which is attached to the underside of the base metal layer with slit 616 by adhesive layer 617. The assembly comprised of layers 612, 614, 615, 616, 617 and 618 which can be laminated in one step to produce a hybrid transaction card comprising a combination of metal layers with a slit, and at least one polymer layer.

The clear hard coat layer can be a lamination film on a release carrier layer or a protective coating of ink, varnish or a polymer which can be laser marked or laser etched.

FIG. 7 illustrates the following exemplary stack-up of layers for a card 700, from a front surface (side) of the card to a rear surface (side) of the card:
element 712: Hard coat layer or a protective coating
element 714: Anodized aluminum layer with a slit to function as a coupling frame
element 716: Base metal layer of stainless steel have a slit
element 718: Polymeric layer with magnetic stripe and security elements
Compare FIG. 4 of US 2017/0098151 (without ferrite layer, without antenna layer).

FIG. 7 illustrates the layers and components of a transaction card of the type shown in FIG. 6 (except that the adhesive layers have been omitted). FIGS. 6 and 7 illustrate that cards of selected texture and coloring embodying the invention may be made to include all the components needed to make each transaction card a "smart" card. In FIGS. 6 and 7, the "smart" cards may be made to include a transponder chip module to inductively couple with the conductive layers which form the card body.

FIG. 8 illustrates an following exemplary stack-up of layers for a card 800, from a front surface (side) of the card to a rear surface (side) of the card:
  element 812: Hard coat layer or a protective coating
  element 814: Anodized aluminum foil (layer) with a slit to function as a coupling frame
  element 815: Adhesive layer of thermosetting epoxy
  element 816: Base metal layer with slit protruding into the anodized aluminum foil FIG. 8 illustrates a stack-up construction used to form a transaction card 800 having integrated metal layers, with said metal layers having a slit to function as a coupling frame for contactless communication. The supporting base metal layer 816 may extend into an opening in the top metal layer 814, attached together by means of an adhesive layer 815. The front surface may be further scratch protected with a clear hard coat film layer 812. The hard coat film layer may also have a pigment for coloring. The hard coat film layer may also allow the absorption and or passage of a laser beam for etching of the metal surface, without thermal distortion of the hard coat film layer.

FIG. 9 illustrates the following exemplary stack-up of layers for a card 900, from a front surface (side) of the card to a rear surface (side) of the card:
  element 914: Anodized aluminum foil (layer) with slit
  element 915: Adhesive layer of thermosetting epoxy
  element 916: Base metal layer of stainless steel with slit
  element 921: Polymeric layer for absorbing mechanical shocks to the ceramic layer 790
  element 990: Ceramic layer, ultra-thin and flexible
  element 923: Magnetic stripe
  element 925: Signature panel
  Compare FIG. 3D (plus slit in aluminum foil, plus slit in base metal, plus polymer layer).

In FIG. 9, an anodized aluminum foil 914 with slit is attached via an adhesive 915 to one side (top surface) of the metal supporting substrate 916 with slit, a polymeric layer is adhesively attached to the other side (bottom surface) of the metal supporting substrate 921 with a ceramic veneer layer 990 attached to the rear side of the polymeric layer 921. A signature panel 923 and a magnetic stripe 925 are shown attached to the ceramic layer 990.

The ceramic veneer layer (20 to 40 microns in thickness) may be laminated between polymer sheets. The ceramic may be placed between two 3-mil sheets of PET or PEN, to encase the ceramic within the 2 sheets. This 3-layer "composite" brings a different level of handling—more forgiving for a brittle material like ceramic. Alternatively, the ceramic veneer layer may be attached to a polymeric material like duct tape. The polymeric layer may be a composition of adhesive and nylon, catgut, carbon fiber, fiber glass or fabric.

An alternative to anodizing is baking of an ink or paint coated layer on a metal surface at elevated temperatures (e.g. at 200° C.).

CNC Milling

Typically, cards may be manufactured (laid up and laminated) in sheet form, each sheet having a plurality of cards, such as in a 5×5 array, and CNC (computer numerical control) machining may be used to singulate (separate) the finished cards from the sheet. Resulting burrs, particularly in the metal layers, may cause defects, such as electrical shorting of the slit. Hence, CNC machining of metal core, metal face or solid metal smartcards may be performed using cryogenic milling, such as in an environment of frozen carbon dioxide or liquid nitrogen.

Some Additional Comments

Some of the card embodiments disclosed herein may have two metal layers, separated by a dielectric coating or an insulating layer, rather than a single metal layer. The two metal layers may comprise different materials and may have different thicknesses than one another. For example, one of the metal layer may be stainless steel while the other metal layer may be titanium. In this manner, the "drop acoustics" of the metal card body may be improved, in that the card, when dropped or tapped (edgewise) on a hard surface, sounds like a solid metal card (making a ringing or tinkling sound), rather than like a plastic card (making a "thud").

Generally, in order for the smartcard to be "RFID-enabled" (able to interact "contactlessly"), each of the one or more metal layers should have a slit, or micro-slit. When there are two (or more) metal layers with slits in the stack-up, the slits in the metal layers should be offset from one another.

Some Generic Characteristics

The smartcards described herein may have the following generic characteristics:
  The card body may have dimensions similar to those of a credit card. ID-1 of the ISO/IEC 7810 standard defines cards as generally rectangular, measuring nominally 85.60 by 53.98 millimeters (3.37 in×2.13 in).
  A chip module (RFID, contact type, or dual interface) may be implanted in a recess (cavity, opening) in the card body. The recess may be a stepped recess having a first (upper, P1 portion) having a cavity depth of 250 µm, and a second (lower, P2 portion) having a cavity depth of (maximum) 600 µm.
  A contact-only or dual interface chip module will have contact pads exposed at a front surface of the card body.
  ISO 7816 specifies minimum and maximum thickness dimensions of a card body: Min 0.68 mm (680 µm) to Max 0.84 mm (840 µm) or Min 0.027 inch to Max 0.033 inch While the invention(s) may have been described with respect to a limited number of embodiments, these should not be construed as limitations on the scope of the invention(s), but rather as examples of some of the embodiments of the invention(s). Those skilled in the art may envision other possible variations, modifications, and implementations that are also within the scope of the invention(s), and claims, based on the disclosure(s) set forth herein.

What is claimed is:

1. A card body for an RFID-enabled smartcard comprising:
  a metal core comprising at least one layer of a metallic material having an opening for a transponder chip module and a slit extending from the opening to a peripheral edge of the metal layer to enable the metal layer to function as a coupling frame;
  a support layer comprising a polymer disposed on a front surface of the metal core; and
  a layer of ultra-thin flexible ceramic material or flexible glass disposed on the polymeric support layer;
  wherein:
  the metal core comprises two layers of metallic material separated by a layer of an insulating or dielectric material.

2. The card body of claim 1, wherein:
the card body has an overall ISO ID-1 size (length and width); and
the metal core and the layer of ceramic material or flexible glass each has a size which is initially larger than the size of the card body, and is subsequently machined to be substantially the same size as the card body.

3. The card body of claim 1, wherein:
the card body has a thickness;
the metal core has a thickness which is 50% to 60% of the card body thickness;
the polymeric support layer has a thickness which is 8%-12% of the card body thickness; and
the ceramic material or glass has a thickness which is 5% to 10% of the card body thickness.

4. The card body of claim 1, wherein:
the card body has a nominal ISO thickness of approximately 760 μm;
the metal core has a thickness of approximately 500 μm;
the ceramic or glass layer has a thickness of approximately 40 μm; and
the support layer has a thickness of approximately 75 μm.

5. The card body of claim 1, wherein the support layer comprises:
a layer of polyethylene terephthalate (PET) or polyethylene naphthalate (PEN) disposed between the layer of ceramic material and the layer of metallic material, to absorb mechanical stress.

6. The card body of claim 5, further comprising:
layers of adhesive on the front and back surfaces of the layer of PET or PEN;
wherein:
the layer of PET or PEN has a thickness of approximately 25 μm; and
each of the adhesive layers has a thickness of approximately 25 μm.

7. The card body of claim 1, wherein:
the metal core including its at least one layer of a metallic material, the support layer and the layer of ceramic or glass are bound together by a thermosetting epoxy.

8. The card body of claim 1, further comprising:
a print layer disposed on a rear surface of the metal core; and
an overlay layer disposed on a rear surface of the print layer.

9. The card body of claim 8, wherein the overlay layer comprises:
a synthetic material with an adhesive backing.

10. The card body of claim 8, wherein the overlay layer comprises:
a layer of ultra-thin flexible ceramic material.

11. The card body of claim 8, further comprising:
a magnetic stripe and security elements disposed on the overlay layer.

12. The card body of claim 8, wherein:
the synthetic material comprises transparent plastic.

13. The card body of claim 1, wherein:
the metallic material comprises at least one of titanium, aluminum, stainless steel and brass.

14. A card body for an RFID-enabled smartcard comprising:
a metal core comprising at least one layer of a metallic material having an opening for a transponder chip module and a slit extending from the opening to a peripheral edge of the metal layer to enable the metal layer to function as a coupling frame;
a support layer comprising a polymer disposed on a front surface of the metal core; and
a layer of ultra-thin flexible ceramic material or flexible glass disposed on the polymeric support layer;
wherein:
the ceramic material comprises 3 mol % Yttria-Stabilized Zirconia (3YSZ).

15. The card body of claim 14, wherein:
the ceramic material is highly polished.

16. The card body of claim 14, further comprising
a pattern or graphics laser etched into the ceramic material.

17. The card body of claim 14, further comprising
a holographic image disposed on an outer surface of the card body.

18. A method for making an RFID-enabled smartcard comprising:
providing a thick metal core layer having first and second surfaces and having a discontinuity to function as a coupling frame, the thick metal core layer forming a supporting body of said transaction card, wherein the thick metal core layer has a thickness in the range of 250 microns to 500 microns;
providing a thin decorative layer, on a front surface of the metal core, having a flexible polymeric backing layer, wherein the thin decorative layer and the polymeric layer together have a thickness in a range of 100 microns to 250 microns; and
attaching said thin decorative layer with the polymeric backing layer to at least one of the surfaces of the thick metal core layer.

19. The method of claim 18, wherein:
the thin decorative layer comprises ceramic material.

20. The method of claim 18, wherein:
the thin decorative layer comprises anodized aluminum.

21. The method of claim 18, wherein:
the thin decorative layer comprises laser reactive material; and
further comprising applying a design to the thin decorative layer.

22. The method of claim 21, wherein:
the design is applied to the thin decorative layer by laser marking or etching.

23. A method for making RFID-enabled metal transaction cards comprising:
providing a core layer for supporting and forming a body of the card, said core layer having first and second surfaces, the core layer comprising a metal layer having a discontinuity;
providing a decorative layer comprising anodized aluminum having a discontinuity; and
attaching the decorative layer to the core layer.

24. The method of claim 23, further comprising:
providing a clear hard coat film layer or a protective coating on the decorative layer, for scratch protection.

25. The method of claim 24, further comprising:
laser marking or engraving the protective coating.

26. The method of claim 23, further comprising:
providing a ceramic coating on the metal layer.

27. The method of claim 23, wherein:
the decorative layer and the core layer are laminated together in a single process step.

* * * * *